US012589531B2

(12) United States Patent　　(10) Patent No.:　US 12,589,531 B2
Honma et al.　　(45) Date of Patent:　Mar. 31, 2026

(54) LAMINATING APPARATUS, AND VACUUM LAMINATING DEVICE AND FLAT PRESS LAMINATING DEVICE USED THEREFOR

(71) Applicant: Nikko-Materials Co., Ltd., Kanagawa (JP)

(72) Inventors: Yoshiaki Honma, Kanagawa (JP); Akiyuki Nakayama, Kanagawa (JP); Tomomi Suzuki, Kanagawa (JP); Takeshi Yamaguchi, Kanagawa (JP); Taihei Matsumoto, Kanagawa (JP)

(73) Assignee: NIKKO-MATERIALS CO., LTD., Kanagawa (JP)

( * ) Notice: Subject to any disclaimer, the term of this patent is extended or adjusted under 35 U.S.C. 154(b) by 0 days.

(21) Appl. No.: 18/693,058

(22) PCT Filed: Jun. 21, 2023

(86) PCT No.: PCT/JP2023/022846
§ 371 (c)(1),
(2) Date: Mar. 18, 2024

(87) PCT Pub. No.: WO2024/018805
PCT Pub. Date: Jan. 25, 2024

(65) Prior Publication Data
US 2025/0065542 A1　　Feb. 27, 2025

(30) Foreign Application Priority Data

Jul. 20, 2022　　(JP) ................................. 2022-115409

(51) Int. Cl.
*B29C 43/56*　　(2006.01)
*B29C 43/14*　　(2006.01)
(Continued)

(52) U.S. Cl.
CPC ............ *B29C 43/56* (2013.01); *B29C 43/146* (2013.01); *B29C 43/36* (2013.01); *B30B 15/061* (2013.01);
(Continued)

(58) Field of Classification Search
CPC ....... B29C 43/36; B29C 43/56; B29C 43/146; B29C 2043/563; B29C 2043/3655; B30B 15/061
See application file for complete search history.

(56) References Cited

U.S. PATENT DOCUMENTS 4,963,221 A * 10/1990 Isobe ..................... B29C 43/36
　　　　　　　　　　　　　　　　　　　　100/324
5,496,433 A * 3/1996 Miyashita ............... B29C 43/56
　　　　　　　　　　　　　　　　　　　　100/316
(Continued)

FOREIGN PATENT DOCUMENTS

CN　　101384416 A　　3/2009
CN　　102398403 A　　4/2012
(Continued)

OTHER PUBLICATIONS

Office Action dated Apr. 11, 2024, issued in Austrian patent application No. A 9004/2023, with English translation thereof.
(Continued)

*Primary Examiner* — Jerzi H Moreno Hernandez
(74) *Attorney, Agent, or Firm* — Greenblum & Bernstein, P.L.C.

(57) ABSTRACT

Disclosed is a laminating apparatus capable of suppressing the generation of voids in a resulting laminate and manufacturing a laminate with improved flatness, including a vacuum laminating device and a first flat press laminating device. The vacuum laminating device includes a pair of plate blocks, and a base material and resin are pressed
(Continued)

between the plate blocks. The plate block which is movable forwardly and backwardly includes an elastic pressing plate and a buffer material, and the buffer material has a multi-layer structure comprised of not less than three layers including a fiber layer and a rubber layer. A pressing force against the base material and the resin between the pair of plate blocks is set in the range of 2.5 to 3.97 MPa per 500 mm square area.

8 Claims, 16 Drawing Sheets

(51) Int. Cl.
   B29C 43/36            (2006.01)
   B30B 15/06            (2006.01)
(52) U.S. Cl.
   CPC ................. *B29C 2043/3655* (2013.01); *B29C 2043/563* (2013.01)

(56)                References Cited

U.S. PATENT DOCUMENTS

| | | | | |
|---|---|---|---|---|
| 11,325,365 | B1 * | 5/2022 | Iwata | ...................... B32B 37/28 |
| 2004/0075988 | A1 * | 4/2004 | Tatsumi | ............... B29C 43/203 |
| | | | | 361/748 |
| 2005/0001351 | A1 | 1/2005 | Yoshida | |
| 2006/0014463 | A1 * | 1/2006 | Yoshida | ............... B30B 15/061 |
| | | | | 442/399 |
| 2018/0162111 | A1 * | 6/2018 | Iwata | ................... H05K 3/4655 |
| 2021/0362480 | A1 * | 11/2021 | Iwata | ................. B32B 37/0007 |
| 2023/0125034 | A1 * | 4/2023 | Liao | ...................... B30B 15/061 |
| | | | | 156/278 |
| 2023/0330898 | A1 * | 10/2023 | Yamamoto | ............. B29C 43/56 |

FOREIGN PATENT DOCUMENTS

| | | | | |
|---|---|---|---|---|
| EP | 1433583 | A1 | | 6/2004 |
| JP | 2003-103552 | A | | 4/2003 |
| JP | 4926840 | B2 | | 5/2012 |
| JP | 2017-001229 | A | | 1/2017 |
| JP | 2020028980 | A | * | 2/2020 |
| JP | 7106242 | B1 | | 7/2022 |

OTHER PUBLICATIONS

Office Action mailed Aug. 8, 2024 issued in Korean patent application No. 10-2024-7021280, with English machine translation.
International Search Report dated Sep. 12, 2023, issued in PCT/JP2023/022846, with English translation thereof.
Written Opinion dated Sep. 12, 2023, issued in PCT/JP2023/022846, with partial English translation thereof.
Office Action issued May 22, 2024 in Chinese patent application No. 202380013356.6, with English translation thereof.
International Preliminary Report on Patentability dated Jan. 30, 2025, including Written Opinion dated Sep. 12, 2023, issued in PCT/JP2023/022846.
Office Action dated May 5, 2025, issued in Singapore patent application No. 11202401644X.

* cited by examiner

| 1 | 2 | 6 | 10 | 28 | 22 | 4 | 8 | 8 | 9 | 14 |
|---|---|---|----|----|----|---|---|---|---|----|
| 3 | 5 | 6 | 8 | 20 | 12 | 3 | 3 | 9 | 7 | 9 |
| 7 | 6 | 6 | 8 | 15 | 10 | 1 | 2 | 6 | 4 | 5 |
| 10 | 7 | 2 | 4 | 4 | 6 | 0 | 0 | 7 | 3 | 1 |
| 8 | 3 | 0 | 1 | 6 | 11 | 5 | 1 | 4 | 0 | 2 |
| 3 | 3 | 2 | 2 | 7 | 17 | 9 | 1 | 3 | 1 | 5 |
| 5 | 9 | 5 | 7 | 7 | 6 | 20 | 1 | 3 | 4 | 9 |
| 0 | 4 | 4 | 4 | 5 | 8 | 7 | 0 | 6 | 3 | 4 |
| 2 | 1 | 4 | 3 | 2 | 2 | 7 | 4 | 8 | 5 | 3 |
| 10 | 5 | 6 | 3 | 5 | 0 | 10 | 9 | 5 | 4 | 1 |
| 18 | 13 | 2 | 0 | 8 | 5 | 10 | 9 | 3 | 1 | 0 |

132

LAMINATING APPARATUS, AND VACUUM LAMINATING DEVICE AND FLAT PRESS LAMINATING DEVICE USED THEREFOR

TECHNICAL FIELD

The present disclosure relates to an apparatus for laminating a base material and resin together. More particularly, the present disclosure relates to a laminating apparatus capable of reducing the time (tact time) required to manufacture a laminate, while improving adhesion between the base material and the resin of the resulting laminate and maintaining a high level of flatness, to manufacture more laminates in a shorter time.

BACKGROUND ART

In recent years, as electronic devices have become smaller and more sophisticated, multi-layered high-density type printed circuit boards (so-called "build-up boards") have been often used for electronic circuit boards mounted on these devices. Such a build-up board is manufactured as a laminate in which a base material having an irregular surface resulting from interconnect lines and the like and resin as an insulative layer are laminated alternately in multiple layers. A laminating apparatus is used for the manufacture of the build-up boards.

In the manufacture of the build-up boards, it is required to adhere the base material and the resin to each other by filling all recesses of the base material having irregularities with the resin without gaps and to laminate the resin flatly onto the irregular surface of the base material. It is especially necessary that the adhesion and flatness levels meet more stringent standards than ever before. This is because there are more and more opportunities to use resins having low fluidity with the increase in variety of resin materials or because the surface irregularities of the build-up board, even if tolerated even in a single layer, accumulate and appear as non-negligible irregularities in the laminate when multiple layers are laminated.

Various proposals have been made to achieve a higher level of adhesion between the base material and the resin and a higher level of surface flatness of the resulting laminate. For example, in PTL 1, it is proposed to heat the resin used for lamination to increase the flexibility of the resin so that the resin flexibly follows the irregularities of the base material, thereby improving the adhesion to the resin and flattening the surface.

On the other hand, it is necessary for the laminating apparatus to make the tact time as short as possible from the viewpoint of production efficiency.

For reduction in tact time, it is contemplated, for example, to heat the resin used for lamination to a higher temperature, thereby making a resin film more fluid and easier to flow into the recesses of the base material.

However, if the resin is heated at a temperature higher than the set temperature, the thermal curing of the resin starts, which in turn tends to impair the fluidity and generate voids. Thus, there is a danger that the quality of the resulting laminate deteriorates.

RELATED ART DOCUMENT

Patent Document

PTL 1: JP-B-4926840

SUMMARY

Against this background, the present disclosure provides a laminating apparatus capable of reducing tact time, while improving adhesion between a base material and resin of a resulting laminate and maintaining a high level of flatness, to manufacture more laminates in a shorter time.

In view of the foregoing, the present inventors have diligently made studies about the configuration of the laminating apparatus. In order to suppress the generation of voids in the resulting laminate and improving the flatness of the surface of the laminate, the present inventors have found out that the problem described above is solved in the laminating apparatus including a vacuum laminating device and a flat press laminating device by providing a forwardly and backwardly movable plate block having an elastic press plate or a flat press plate in the vacuum laminating device and/or the flat press laminating device and by setting the pressing force between the pair of plate blocks against an object in the range of 1.67 to 3.97 MPa per 500 mm square area.

Specifically, the present disclosure has the following aspects [1] to [10].

[1]A laminating apparatus for laminating resin to a base material to form a laminate, comprising: a vacuum laminating device for pressing the base material and resin under reduced pressure to form a pre-laminate; and a first flat press laminating device for pressing the pre-laminate to form a laminate, wherein the vacuum laminating device includes a pair of plate blocks facing each other, and at least one of the plate blocks is set so as to be movable forwardly and backwardly relative to the other of the plate blocks, whereby the base material and resin are pressed between the pair of plate blocks, wherein the forwardly and backwardly movable plate block includes an elastic pressing plate, and wherein a pressing force against the base material and resin between the pair of plate blocks is set in the range of 1.67 to 3.97 MPa per 500 mm square area.

[2]A laminating apparatus for laminating resin to a base material to form a laminate, comprising: a vacuum laminating device for pressing the base material and resin under reduced pressure to form a pre-laminate; and a first flat press laminating device for pressing the pre-laminate to form a laminate, wherein the first flat press laminating device includes a pair of plate blocks facing each other, and at least one of the plate blocks is set so as to be movable forwardly and backwardly relative to the other of the plate blocks, whereby the pre-laminate is pressed between the pair of plate blocks, wherein the forwardly and backwardly movable plate block includes a flat press plate, and wherein a pressing force against the pre-laminate between the pair of plate blocks is set in the range of 1.67 to 3.97 MPa per 500 mm square area.

[3] The laminating apparatus according to [1], wherein a hydraulic cylinder is coupled to the movable plate block of the vacuum laminating device, and the movable plate block is movable forwardly and backwardly by the operation of the hydraulic cylinder, and wherein the hydraulic cylinder has a cylinder diameter of not less than 200 mm.

[4] The laminating apparatus according to [2], wherein a hydraulic cylinder is coupled to the movable plate block of the first flat press laminating device, and the movable plate block is movable forwardly and backwardly by the operation of the hydraulic cylinder, and wherein the hydraulic cylinder has a cylinder diameter of not less than 200 mm.

[5] The laminating apparatus according to any one of [1] to [4], further comprising a second flat press laminating device, wherein the second flat press laminating device includes a pair of plate blocks facing each other, and at least one of the plate blocks is set so as to be movable forwardly and backwardly relative to the other of the plate blocks, whereby a laminate obtained through the pressing by the first flat press laminating device is further pressed between the pair of plate blocks.

[6] The laminating apparatus according to any one of [1] to [4], wherein the elastic pressing plate in the vacuum laminating device is made of at least one selected from the group consisting of fluoro rubber, silicone rubber, ethylene-vinyl acetate copolymer, acrylic rubber, and epichlorohydrin rubber.

[7] A vacuum laminating device for use in a laminating apparatus as recited in [1] or [3], comprising a pair of plate blocks facing each other, wherein at least one of the plate blocks is set so as to be movable forwardly and backwardly relative to the other of the plate blocks, whereby the base material and resin are pressed between the pair of plate blocks, wherein the forwardly and backwardly movable plate block includes an elastic pressing plate, and wherein a pressing force against the base material and resin between the pair of plate blocks is set in the range of 1.67 to 3.97 MPa per 500 mm square area.

[8] A vacuum laminating device for use in a laminating apparatus as recited in [5], comprising a pair of plate blocks facing each other, wherein at least one of the plate blocks is set so as to be movable forwardly and backwardly relative to the other of the plate blocks, whereby the base material and resin are pressed between the pair of plate blocks, wherein the forwardly and backwardly movable plate block includes an elastic pressing plate, and wherein a pressing force against the base material and resin between the pair of plate blocks is set in the range of 1.67 to 3.97 MPa per 500 mm square area.

[9] A first flat press laminating device for use in a laminating apparatus as recited in [2] or [4], comprising a pair of plate blocks facing each other, wherein at least one of the plate blocks is set so as to be movable forwardly and backwardly relative to the other of the plate blocks, whereby the pre-laminate is pressed between the pair of plate blocks, wherein the forwardly and backwardly movable plate block includes a flat press plate, and wherein a pressing force against the pre-laminate between the pair of plate blocks is set in the range of 1.67 to 3.97 MPa per 500 mm square area.

[10] A first flat press laminating device for use in a laminating apparatus as recited in [5], comprising a pair of plate blocks facing each other, wherein at least one of the plate blocks is set so as to be movable forwardly and backwardly relative to the other of the plate blocks, whereby the pre-laminate is pressed between the pair of plate blocks, wherein the forwardly and backwardly movable plate block includes a flat press plate, and wherein a pressing force against the pre-laminate between the pair of plate blocks is set in the range of 1.67 to 3.97 MPa per 500 mm square area.

The laminating apparatus of the present disclosure is capable of improving adhesion between the base material and the resin and suppressing the generation of voids. In addition, the laminating apparatus of the present disclosure is capable of reducing tact time and maintaining a high level of flatness of the resulting laminate.

The vacuum laminating device and the first flat press laminating device of the present disclosure are capable of suppressing the generation of voids to provide a laminate with improved flatness by replacing part of the existing laminating apparatus with these devices.

BRIEF DESCRIPTION OF DRAWINGS

FIG. 9 is a view

FIG. 16 is a view showing a result of Comparative Example 2.

DESCRIPTION OF EMBODIMENTS

The present disclosure will now be described based on an example of a form for embodying the present disclosure. However, the present disclosure is not limited to embodiments to be described below.

In the present disclosure, the expression "X to Y" (X is any number and Y is any number), unless otherwise specified, means "not less than X and not greater than Y" and also includes the meaning of "preferably greater than X" or "preferably less than Y".

Also, the expression "not less than X" (X is any number) or "not greater than Y" (Y is any number) includes the meaning of "preferably greater than X" or "preferably less than Y".

Further, "X and/or Y (X and Y each represent any configuration)" means at least one of X and Y, and means three combinations: X only, Y only, and X and Y.

Figure 1:
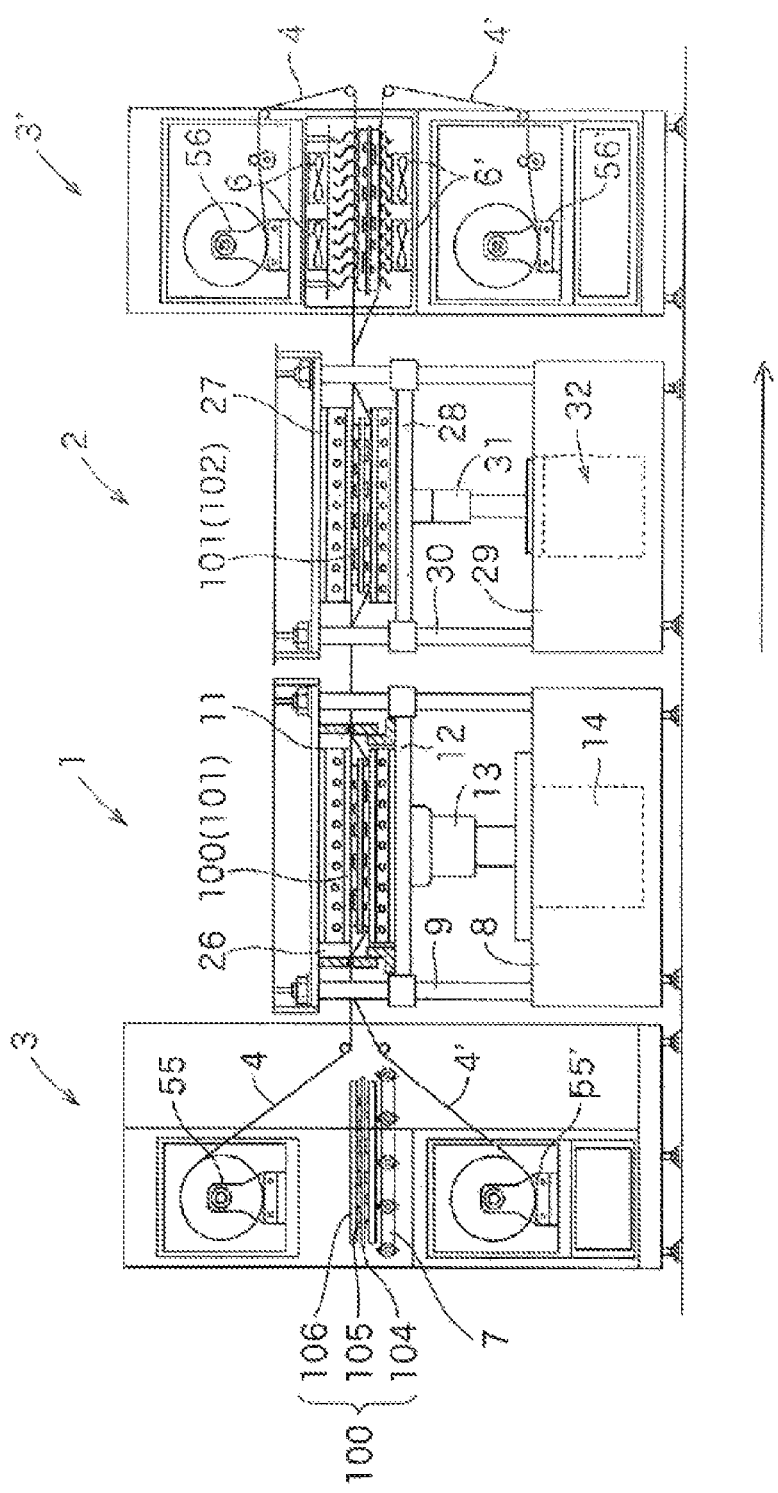
FIG. 1 is a schematic view illustrating a configuration of a laminating apparatus according to a first embodiment of the present disclosure.

FIG. 1 shows a laminating apparatus according to one embodiment of the present disclosure. This laminating apparatus is an apparatus for laminating an insulative layer made of resin 106 or the like to a base material 104 for a build-up board provided with irregularities due to interconnect lines or the like such as a copper pattern 105. The laminating apparatus includes conveying devices 3 and 3' for sequentially conveying workpieces 100, which are objects to be pressed, by unwinding conveying films 4 and 4' from one side and winding the conveying films 4 and 4' on the other side. A vacuum laminating device 1 and a first flat press laminating device 2 are arranged in this order along a flow of an arrow of the conveying films 4 and 4'.

The vacuum laminating device 1 is a device for pressing a workpiece 100 in which the base material 104 has opposite irregular surfaces due to the arrangement of the copper pattern 105 and in which the resin 106 is placed on the irregular surfaces to thereby form a first pre-laminate 101 in which the resin 106 adheres to and follows the irregularities formed by the copper pattern 105 on the base material 104.

The first flat press laminating device 2 is a device for further pressing the first pre-laminate 101 formed by the vacuum laminating device 1 to thereby form a first laminate 102 in which the irregular surfaces of the first pre-laminate 101 are flattened.

The workpiece 100, the first pre-laminate 101, and the first laminate 102 are sandwiched between the conveying films 4 and 4' and are conveyed from the conveying device 3 toward the conveying device 3'. The conveying device 3 has a carry-in conveyor 7 for carrying the workpiece 100 into the process. The conveying device 3' has fans 6 and 6' for cooling the first laminate 102 flattened by the first flat press laminating device 2. In the conveying device 3', the completed first laminate 102 is taken out of a conveyance line from between the conveying films 4 and 4' which are to be wound up.

In the workpiece 100 which is the target of the laminating apparatus of the present disclosure, the shape of the resin 106 used as the insulative layer is not particularly limited, and may be the form of a thin film or powder. However, the laminating apparatus of the present disclosure is capable of providing a laminate excellent in surface flatness without generating internal voids even when attempting the surface flatness by using a resin material mainly composed of powdered resin which has been difficult to laminate in conventional laminating apparatuses or resin which has high heat resistance and cannot be expected to follow due to heating, such as polyimide, or by using a small amount of resin material. It is hence preferred that the laminating apparatus of the present disclosure is used for the lamination of the workpiece 100 using these powdered resins. The devices 1 to 3 will be described hereinafter in detail.

[Vacuum Laminating Device 1]

The vacuum laminating device 1 positions the workpiece 100 conveyed by the carry-in conveyor 7 of the conveying device 3 and the conveying films 4 and 4' between an upper plate block 11 and a lower plate block 12, and presses the workpiece 100 in a space portion 26 in a reduced pressure state with a force of 1.67 to 3.97 MPa per 500 mm square area to fill recesses of the base material 104 having irregularities with the resin 106 without gaps and to cause the resin 106 to adhere to the irregularities formed on the base material 104, thereby forming the first pre-laminate 101.

Figure 2:
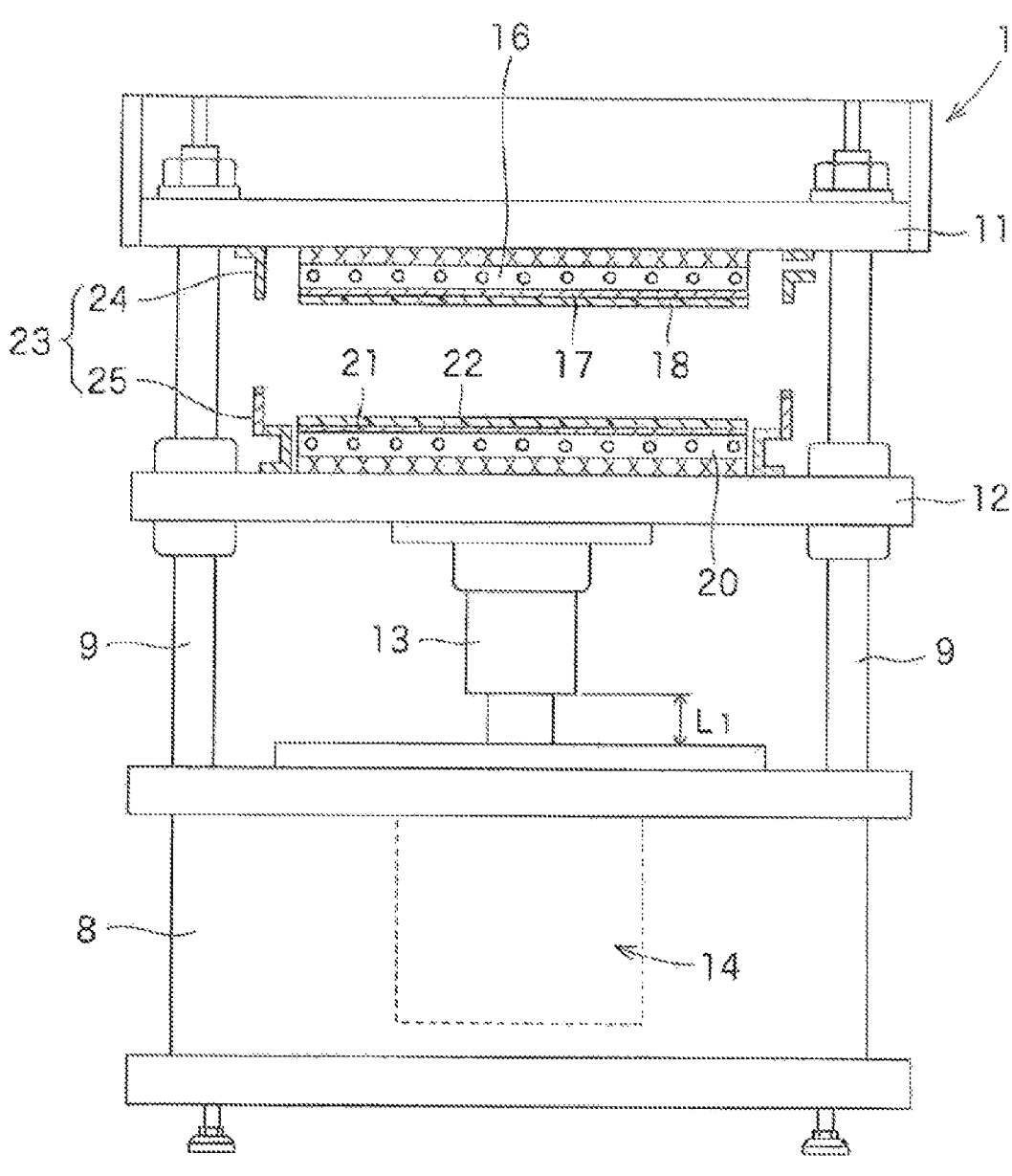
FIG. 2 is an illustration of a vacuum laminating device of the laminating apparatus of the first embodiment.

The configuration of the vacuum laminating device 1 will be described in further detail. As shown in FIG. 2, this vacuum laminating device 1 includes: four support posts 9 provided upright at four corners on a press stand 8 (although only two support posts are shown in FIG. 2); the upper plate block 11 fixed to the support posts 9 with bolts, nuts, and other fixing members; the lower plate block 12 mounted movably forwardly and backwardly (upwardly and downwardly) to the support posts 9; and the like. This lower plate block 12 is coupled to a hydraulic cylinder 14 via a joint 13, and is moved forwardly and backwardly (upwardly and downwardly) by the operation of the hydraulic cylinder 14. Thus, the lower plate block 12 is movable forwardly and backwardly while kept in parallel with the upper plate block 11 by the arrangement of the support posts 9 at the four corners of the press stand 8. This allows uniform pressing against the entire surface of the workpiece 100 even if a stronger force than ever before is used for the pressing, to thereby reduce variations in thickness of resulting first pre-laminates 101 (with reference to FIG. 4).

A planar upper heating platen 16, an upper buffer material 17, and an upper elastic pressing plate 18 are fixed to the upper plate block 11 in this order from the top. A planar lower heating platen 20, a lower buffer material 21, and a lower elastic pressing plate 22 are fixed to the lower plate block 12 in this order from the bottom.

The buffer materials 17 and 21 deform in response to the deformation of the elastic pressing plates 18 and 22 during pressing to enable the elastic pressing plates 18 and 22 to press along the irregularities of the workpiece 100. The material, thickness, and the like of the buffer materials 17 and 21 are generally selected as appropriate in accordance with the elastic pressing plates 18 and 22.

The buffer materials 17 and 21 may be comprised of a single layer or multiple layers. In particular, the buffer materials 17 and 21 are preferably comprised of three or more layers, and more preferably comprised of three to seven layers.

When the buffer materials 17 and 21 are multi-layered, a multi-layer structure having fiber and rubber layers is preferably used because of its ability to press more uniformly. In particular, a multi-layer structure in which the layers are arranged so that a fiber layer is on the top surface, such as fiber layer/rubber layer/fiber layer, is more preferably used. The buffer materials 17 and 21 which include multiple buffer materials 17 and 21 stacked one upon another may be used for reasons of adjustment of buffering effects or the like. In such a case, the number of layers of the buffer materials 17 and 21 shall be the total number of layers contained in the stacked buffer materials.

For example, chemical fibers, glass fibers, or the like woven into cloth form are preferably used for the fiber layer of the buffer materials 17 and 21. Examples of the fibers include glass fiber, polyester, aramid, other polar hard materials, nonpolar hard materials such as polyethylene, polar soft materials such as polyesters and nylons, and nonpolar soft materials such as olefins, which are preferably used because of their easy bonding with rubber. Polyester, nylon, and aramid are more preferably used because of their excellent strength and heat resistance.

Examples of the rubber layer of the buffer materials 17 and 21 include: sulfur vulcanized rubber such as natural rubber (NR), isoprene rubber (IR), butyl rubber (IIR), ethylene propylene rubber (EPDM), butadiene rubber (BR), styrene-butadiene rubber (SBR), chloroprene rubber (CR), and nitrile rubber (NBR); and peroxide vulcanized rubber such as silicone rubber (SI), fluoro rubber (FKM), ethylene propylene rubber (EPDM), hydrogenated nitrile rubber (HNBR), butadiene rubber (BR), and styrene-butadiene rubber (SBR).

Among these, rubber with resistance to heat up to 230° C. is preferable. In particular, fluoro rubber, and especially vinylidene fluoride rubber are preferably used. Also, ethylene-vinyl acetate copolymer (EVA), epichlorohydrin rubber (CO, ECO, or GECO), or the like may be used.

These may be used either alone or in combination.

In the present disclosure, "vulcanization" is used as a generic term to refer to the curing of rubber, and curing by cross-linking is also included in vulcanization.

The thickness of the buffer materials 17 and 21 is not particularly limited, but is preferably in the range of 0.1 to 5 mm, and more preferably in the range of 0.2 to 3 mm. When the buffer materials 17 and 21 are multi-layered, the sum of the thicknesses of the respective layers (total thickness) is preferably within the range described above.

The elastic pressing plates 18 and 22 are members that abut against the workpiece 100 during pressing. Smaller variations in thickness of the elastic pressing plates 18 and 22 are generally considered more desirable so that the elastic pressing plates 18 and 22 are able to press the workpiece 100 with uniform force. In the present disclosure, however, the pressing force is as strong as 1.67 to 3.97 MPa per 500 mm square area. This suppresses non-uniform pressing resulting from variations in thickness. Thus, the variations in thickness of the elastic pressing plates 18 and 22 are not particularly limited. For example, it is sufficient that the variations in thickness of the elastic pressing plates 18 and 22 are set to not greater than 0.25 mm, preferably not greater than 0.2 mm, more preferably not greater than 0.1 mm, and further preferably not greater than 0.05 mm.

The variations in thickness described above represent a difference between the maximum and minimum values obtained by measuring the thicknesses at multiple locations (in this example, five locations) with a micrometer.

The elastic pressing plates 18 and 22 have a surface Shore A hardness (durometer hardness) preferably in the range of 10 to 80 degrees, more preferably in the range of 20 to 70 degrees, and further preferably in the range of 40 to 60 degrees. If the elastic pressing plates 18 and 22 are too hard, the elastic pressing plates 18 and 22 tend not to able to deform in response to the irregularities appearing on the surfaces of the workpiece. If the elastic pressing plates 18 and 22 are too soft, it is difficult for the elastic pressing plates 18 and 22 to press against the workpiece without loss, and the pressing pressure tends to be lower than the set value. In addition, there appears a tendency to deteriorate in durability to withstand repeated use.

The elastic pressing plates 18 and 22 have a thickness generally in the range of 0.2 to 20 mm, preferably in the range of 0.2 to 10 mm, and more preferably in the range of 0.5 to 5 mm. If the elastic pressing plates 18 and 22 are too thick, the elastic pressing plates 18 and 22 tend not to be able to provide effectiveness higher than a predetermined degree. If the elastic pressing plates 18 and 22 are too thin, the elastic pressing plates 18 and 22 tend not to be able to deform in response to the irregularities appearing on the surfaces of the workpiece.

The material of the elastic pressing plates 18 and 22 is not particularly limited, but preferably has resistance to heat up to 230° C. Depending on the type of the resin 106 used in the workpiece 100, the tact time is further reduced by moderate heating.

Examples of the material of the elastic pressing plates 18 and 22 include: sulfur vulcanized rubber such as natural rubber (NR), isoprene rubber (IR), butyl rubber (IIR), ethylene propylene rubber (EPDM), butadiene rubber (BR), styrene-butadiene rubber (SBR), chloroprene rubber (CR), and nitrile rubber (NBR); and peroxide vulcanized rubber such as silicone rubber (SI), fluoro rubber (FKM), acrylic rubber (ACM), ethylene propylene rubber (EPDM), hydrogenated nitrile rubber (HNBR), butadiene rubber (BR), and styrene-butadiene rubber (SBR).

Also, ethylene-vinyl acetate copolymer (EVA), epichlorohydrin rubber (CO, ECO, or GECO), or the like may be used.

These may be used either alone or in combination.

The upper heating platen 16 and the lower heating platen 20 have heating members provided therein in an appropriate arrangement and for heating the elastic pressing plates 18 and 22. However, the heating platens 16 and 20 are not essential components.

The laminating apparatus of the present disclosure is capable of sufficient lamination without excessive heating. On the other hand, the provision of the heating platens 16 and 20 is preferable because heating may reduce the tact time, depending on the material of the resin 106 used for lamination. When the heating platens 16 and 20 are provided, the heating members described above are not particularly limited, but examples thereof have multiple sheathed heaters arranged therein.

When the heating platens 16 and 20 are provided, it is preferable to provide a temperature control system for controlling the temperature of the heating platens 16 and 20. The provision of the temperature control system allows the pressing under constant temperature conditions without being affected by the ambient temperature, to thereby suppress the occurrence of variations in thickness from one pressing to another. This is also more efficient because the need to examine and change the pressing conditions is eliminated for each pressing of the workpiece 100.

The temperature control system may be of any type as long as the temperature control system is capable of controlling the temperature of the heating platens 16 and 20. An example of the temperature control system has a temperature sensor for measuring the temperature of the heating platens 16 and 20, a controller connected to a computer, and the like, and calculates a difference between temperature information obtained from the temperature sensor and a preset temperature to turn on/off a power supply of the heating members so that the preset temperature is reached.

The vacuum laminating device 1 includes a movable vacuum frame 23 for creating the space portion 26 in a reduced pressure state (with reference to FIG. 1). This movable vacuum frame 23 includes an upper fixed frame portion 24 in the form of a substantially rectangular frame fixed hermetically to a lower surface of the upper plate block 11, and a movable frame portion 25 fixed hermetically to an upper surface of the lower plate block 12.

A vacuuming nozzle (not shown) is coupled to the upper fixed frame portion 24. With both the plate blocks 11 and 12 closed, this vacuuming nozzle is used to draw a vacuum in the sealed space portion 26 formed between the upper fixed frame portion 24 and the movable frame portion 25, thereby adjusting the pressure in the space portion 26 (into a state reduced to a predetermined pressure). The pressure in the space portion 26 during the pressing of the workpiece 100 is preferably in the range of 0.1 to 2 hPa, and more preferably in the range of 0.2 to 1 hPa.

The vacuuming nozzle may be coupled to the upper plate block 11, rather than the upper fixed frame portion 24. Such vacuuming nozzles may be provided in multiple locations. The provision of the vacuuming nozzles in multiple locations allows the adjustment of the pressure in the space portion 26 with higher accuracy.

In this embodiment, the hydraulic cylinder 14 for moving the lower plate block 12 forwardly and backwardly is coupled to the lower plate block 12, so that hydraulic pressing is performed on the workpiece 100. However, any elevating mechanism may be used as long as a predetermined pressing force is achieved. An example of such an elevating mechanism includes an electric motor, in addition to the hydraulic cylinder 14. In particular, hydraulic pressing using the hydraulic cylinder 14 is preferably performed because of the capability of strong pressing even in a smaller size.

The hydraulic cylinder 14 has a stroke length $L_1$ set preferably to not greater than 230 mm, and more preferably in the range of 150 to 200 mm. If the stroke length $L_1$ of the hydraulic cylinder 14 is set in the range described above, the replacement of a conventional laminating apparatus is allowed because the apparatus dimensions substantially the same as those of the conventional laminating apparatus are achieved while a stronger pressure force than ever before is provided. This eliminates the need for extra cost and space for arrangement and is hence preferable because the preparation of only the necessary apparatus is merely required.

The hydraulic cylinder 14 has a diameter set preferably to not less than 200 mm, and more preferably in the range of 200 to 270 mm. If the cylinder diameter of the hydraulic cylinder 14 is set in the range described above, the hydraulic cylinder 14 tends to easily achieve a stronger pressing force than ever before.

It is important that the pressing force against the workpiece 100 (the base material 104 and the resin 106) between the pair of plate blocks 11 and 12 is set in the range of 1.67 to 3.97 MPa per 500 mm square area, preferably in the range of 2.0 to 3.5 MPa, and more preferably in the range of 2.5 to 3.5 MPa. The hydraulic cylinder 14 used in the present disclosure is also generally capable of pressing at less than 1.67 MPa.

If the pressing force against the workpiece 100 is in the range described above, the resin 106 is allowed to follow the irregularities caused by the copper pattern 105 on the surfaces of the base material 104 in a more adherent state even without exactly controlling the variations in thickness of the elastic pressing plates 18 and 22 which are members for abutting against the workpiece 100. This achieves the formation of the first pre-laminate 101 without voids in a short time.

It is preferable that the laminating apparatus of the present embodiment includes a pressing control system for controlling the pressing force between the pair of plate blocks 11 and 12. The provision of the pressing control system allows the use of any elevating mechanism having a constant pressing force without any limitations. In addition, since the pressing force is more easily set within a desired range, a higher level of lamination, e.g. the application of an optimal pressing force in the light of temperature information during the pressing, is achieved.

The pressing control system may be of any type as long as the pressing control system is capable of controlling the pressing force between the pair of plate blocks 11 and 12. An example of the pressing control system has a sensor for detecting the hydraulic pressure of the hydraulic cylinder 14, a sensor for detecting the position of the hydraulic cylinder 14, a controller connected to a computer, or the like, and controls the opening and closing of a solenoid valve of a hydraulic pump controlled to apply a preset pressing force, based on information provided from the sensors.

[First Flat Press Laminating Device 2]

The first flat press laminating device 2 (referring again to FIG. 1) positions the first pre-laminate 101 conveyed from the vacuum laminating device 1 by the conveying films 4 and 4' between upper and lower plate blocks 27 and 28, and presses the first pre-laminate 101 with the upper and lower plate blocks 27 and 28 to smooth the surfaces of the first pre-laminate 101, thereby forming the first laminate 102.

Figure 3:
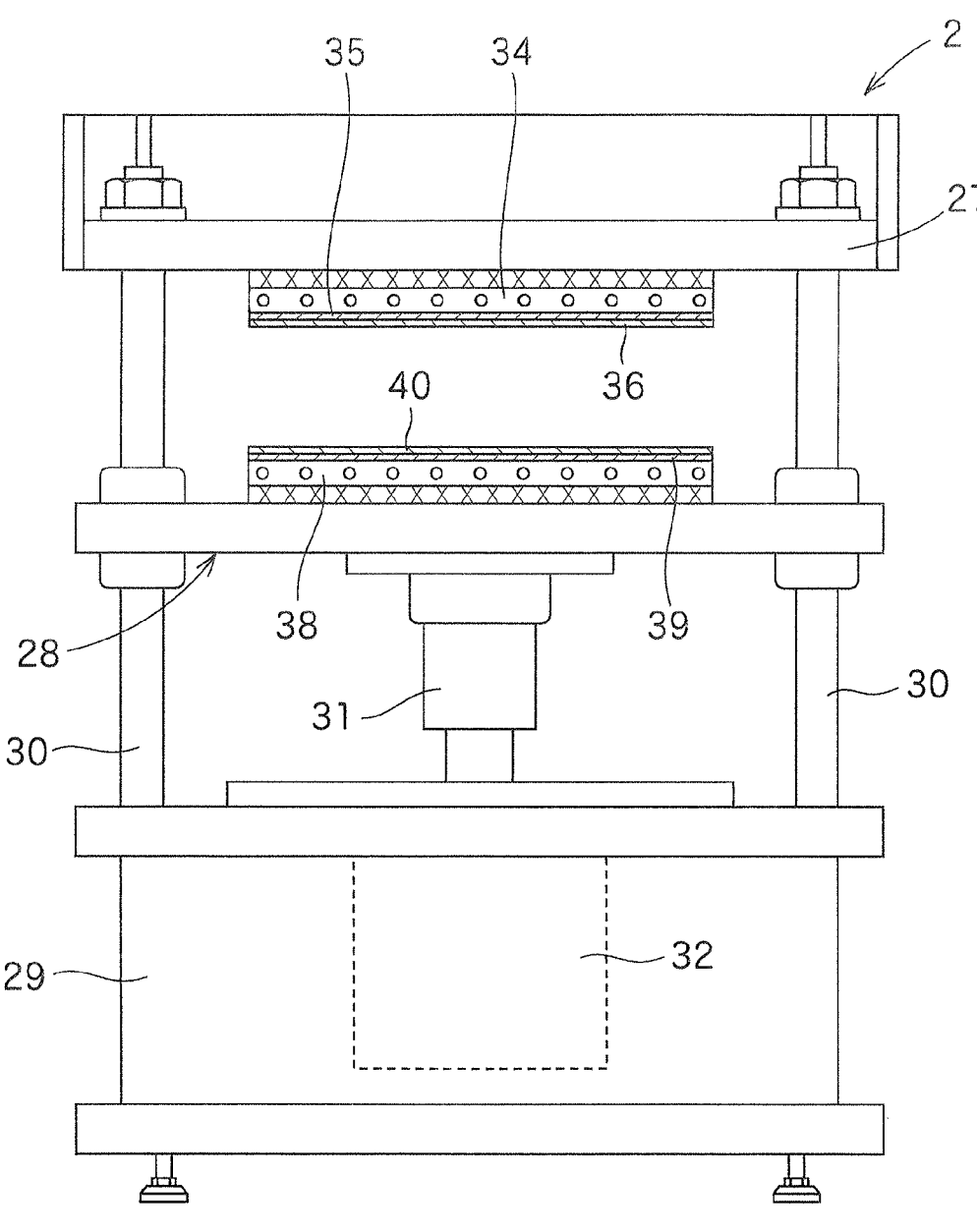
FIG. 3 is an illustration of a first flat press laminating device of the laminating apparatus of the first embodiment.

As shown in FIG. 3, the first flat press laminating device 2 in this embodiment includes: four support posts 30 provided upright on a press stand 29 (although only two support posts are shown in FIG. 3); the upper plate block 27 fixed to the support posts 30 with bolts, nuts, and other fixing members; the lower plate block 28 mounted movably forwardly and backwardly (upwardly and downwardly) to the support posts 30; and the like.

This lower plate block 28 is coupled to a hydraulic cylinder 32 via a joint 31, and is moved upwardly and downwardly (forwardly and backwardly) by the operation of the hydraulic cylinder 32.

Of the upper and lower plate blocks 27 and 28, the upper plate block 27 includes a planar upper heating platen 34, a planar upper buffer material 35, and an upper flexible metal plate (flat pressing plate) 36, which are fixed in this order from the top. The lower plate block 28 includes a planar lower heating platen 38, a planar lower buffer material 39, and a lower flexible metal plate (flat pressing plate) 40, which are fixed in this order from the bottom.

The upper heating platen 34 and the lower heating platen 38 have heating members provided therein in an appropriate arrangement and for heating the flexible metal plates 36 and 40. However, the heating platens 34 and 38 are not essential components.

The laminating apparatus of the present disclosure is capable of sufficient lamination without heating. On the other hand, heating may reduce the tact time, depending on the material of the resin 106 used for lamination. When the heating platens 34 and 38 are provided, the heating members described above are not particularly limited, but examples thereof have multiple sheathed heaters arranged therein.

When the heating platens 34 and 38 are provided, it is preferable to provide a temperature control system for controlling the temperature of the heating platens 34 and 38. The provision of the temperature control system allows the pressing under constant temperature conditions without being affected by the ambient temperature, to thereby suppress the occurrence of variations in thickness from one pressing to another. This is also more efficient because the need to examine and change the pressing conditions is eliminated for each pressing of the first pre-laminate 101.

The temperature control system may be of any type as long as the temperature control system is capable of controlling the temperature of the heating platens 34 and 38. An example of the temperature control system has a temperature sensor for measuring the temperature of the heating platens 34 and 38, a controller connected to a computer, or the like, and calculates a difference between temperature information obtained from the temperature sensor and a preset temperature to turn on/off a power supply of the heating members so that the preset temperature is reached.

The buffer materials 35 and 39 have a surface Shore A hardness (durometer hardness) preferably not less than 60 degrees, and more preferably in the range of 65 to 75 degrees. This is because the surface Shore A hardness in the range described above makes the film thickness of the resin 106 after pressing more uniform.

In the present disclosure, the Shore A hardness is pursuant to JIS K6253 and measured using Type A durometer. The Shore A hardness may be measured for each test specimen made of rubber, synthetic resin, or the like that constitutes the buffer materials 35 and 39.

The buffer materials 35 and 39 have a thickness generally in the range of 0.2 to 20 mm, preferably in the range of 0.2 to 10 mm, and more preferably in the range of 0.5 to 3 mm. If the thickness of the buffer materials 35 and 39 is in the range described above, the buffering effects are sufficiently exhibited, and a uniform force is applied to the pressing surface, so that the pressing follows the irregularities on the surfaces of the first pre-laminate 101.

The upper buffer material 35 and the lower buffer material 39 may have thicknesses different from each other or the same thickness.

The material of the buffer materials 35 and 39 may generally be paper, rubber, synthetic resin, fiber, or the like. In particular, rubber is preferably used, and fluoro rubber is especially preferably used. Examples of the fluoro rubber include vinylidene fluoride rubber, fluorine-containing silicone rubber, tetrafluoroethylene rubber, fluorine-containing vinyl ether rubber, fluorine-containing phosphonitrile rubber, fluorine-containing acrylate rubber, fluorine-containing nitrosomethane rubber, fluorine-containing polyester rubber, and fluorine-containing triazine rubber.

The buffer materials 35 and 39 may contain heat-resistant resin, glass fiber sheets, metal foil sheets, or the like, or may be a combination of different materials such as rubber and fiber. The buffer materials 35 and 39 may be made of materials different from each other or the same material.

The flexible metal plates 36 and 40 used as the flat pressing plates have a thickness generally in the range of 0.1 to 10 mm, and preferably in the range of 1 to 3 mm. If the thickness of the flexible metal plates 36 and 40 is in the range described above, the mechanical strength is ensured even when a stronger pressing force than ever before is applied. This allows the flexible metal plates 36 and 40 to sufficiently follow the deformation of the buffer materials 35 and 39 as the buffer materials 35 and 39 follow the first pre-laminate 101.

The material of the flexible metal plates 36 and 40 generally used includes stainless steel, iron, aluminum, aluminum alloys, or the like. Among these, stainless steel is preferably used because of its excellent resistance to rust. When the surfaces of the flexible metal plates 36 and 40 are mirror polished by buffing or the like, the surfaces of the resulting first laminate 102 are more mirror-finished.

In this embodiment, the hydraulic cylinder 32 is coupled to the lower plate block 28, and the pressing force against the first pre-laminate 101 is set generally to not greater than 1.6 MPa per 500 mm square area, and preferably in the range of 0.3 to 1.6 MPa. Other elevating mechanisms such as an air cylinder or a servo press may be used in place of the hydraulic cylinder 32.

The pressing by the first flat press laminating device 2 may be performed under atmospheric pressure or under reduced pressure. The pressing under atmospheric pressure shortens the tact time, and achieves lower costs because there is no need to provide a configuration for the pressing under reduced pressure.

On the other hand, the pressing under reduced pressure requires the provision of a configuration for the pressing under reduced pressure in the first flat press laminating device 2, but reduces the generation of voids through the use of a vacuum environment. In addition, even when a less flexible resin is used, the irregularities on the surfaces of the first pre-laminate 101 are further flattened, whereby the flatness of the surfaces of the resulting laminate is improved.

[Conveying Devices]

The conveying devices 3 and 3' (referring again to FIG. 1) includes upper and lower conveying film unwinding machines 55 and 55' located at the starting points of the process, the carry-in conveyor 7 for carrying the workpieces 100 into the process, conveying film winding machines 56 and 56' located at the ending points of the process, multiple guide rollers for supporting the conveying films 4 and 4' conveying the workpieces 100 and the like at various locations in the process, and the like.

The sheet-fed workpieces 100 supplied at predetermined intervals from the carry-in conveyor 7 to the process are sandwiched at predetermined intervals between the upper and lower conveying films 4 and 4' unwound from the respective conveying film unwinding machines 55 and 55'. Then, while being guided by the guide rollers in synchronism with the flow (running) of the conveying films 4 and 4', the sheet-fed workpieces 100 pass between the upper and lower plate blocks 11 and 12 of the vacuum laminating device 1, between the upper and lower plate blocks 27 and 28 of the first flat press laminating device 2, and between the fans 6 and 6' for cooling the resulting first laminates 102. After the first laminates 102 are cooled, the upper and lower conveying films 4 and 4' are released, and the first laminates 102 are taken out of the conveyance line.

The upper and lower conveying films 4 and 4' from which the first laminates 102 are taken out are wound onto the conveying film winding machines 56 and 56', respectively. The wound conveying films 4 and 4' are generally discarded, but may be reused if necessary.

The provision of the conveying devices 3 and 3' provides higher lamination efficiency and shortens the tact time.

Figure 4:
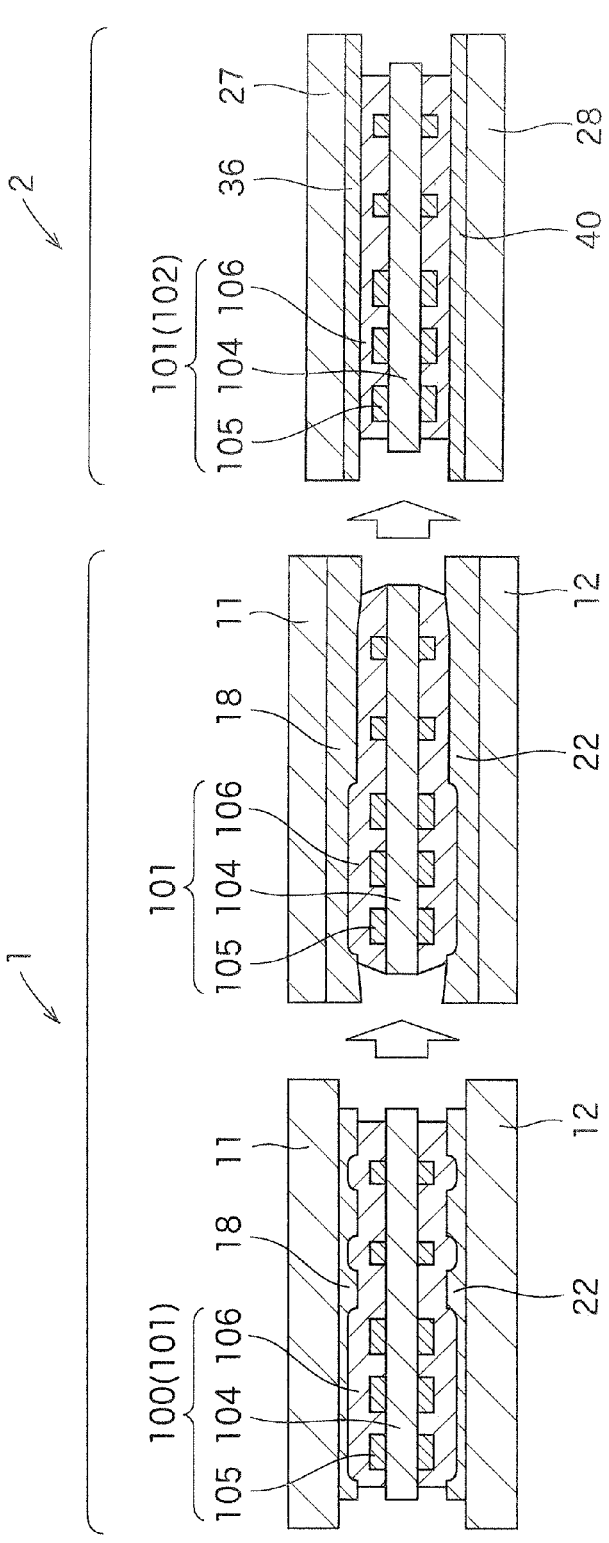
FIG. 4 is a view illustrating changes in lamination state of an object to be pressed in the vacuum laminating device and the first flat press laminating device in the laminating apparatus of the first embodiment.

According to the laminating apparatus described above, the plate blocks 11 and 12 of the vacuum laminating device 1 have the buffer materials 17 and 21 and the elastic pressing plates 18 and 22. The elastic pressing plates 18 and 22 are made of rubber with thickness variations set to not greater than 0.25 mm. The pressing force against the base material 104 and the resin 106 between the pair of plate blocks 11 and 12 is set in the range of 1.67 to 3.97 MPa per 500 mm square area. Thus, as shown in FIG. 4, the state of the resin 106 changes in the vacuum laminating device 1, so that the resin 106 fills the recesses of irregularities of the base material 104 without gaps. As a result, the resin 106 adheres to and follows the irregularities of the base material 104. This provides the first pre-laminate 101 in which the generation of voids is suppressed. In FIG. 4, the range indicated by the reference numeral 1 shows a change in state of the workpiece 100 in the vacuum laminating device 1.

The first pre-laminate 101 in which the generation of voids is suppressed is pressed by the flat surfaces of the flexible metal plates (flat pressing plates) 36 and 40 (with reference to FIG. 3) of the first flat press laminating device 2 kept flat on the flat surfaces, as indicated by the reference numeral 2 of FIG. 4, in the first flat press laminating device 2. This provides the first laminate 102 in which the surface irregularities are further eliminated and a small amount of resin 106 is forced out. In FIG. 4, the range indicated by the reference numeral 2 shows a change in state of the first pre-laminate 101 in the first flat press laminating device 2.

In this manner, this embodiment produces the first pre-laminates 101 in a short time while suppressing the generation of voids by pressing at high pressure to thereby manufacture more first laminates 102 in a short time while suppressing the generation of voids in the resulting first laminates 102. This suppresses the generation of voids even when not only conventional film-type resin but also powder-type resin is used as the resin 106, and achieves the lamination with an extremely high level of surface flatness. Further, whereas there has been a conventional tendency to heat the resin 106 at more excessively high temperatures for the purpose of reducing the tact time, this embodiment eliminates the need for such heating to thereby prevent the resin 106 from thermally curing and impairing the fluidity thereof.

The figures in FIG. 4 schematically show the process and the apparatus, with portions not necessary for illustration dispensed with.

Figure 5:
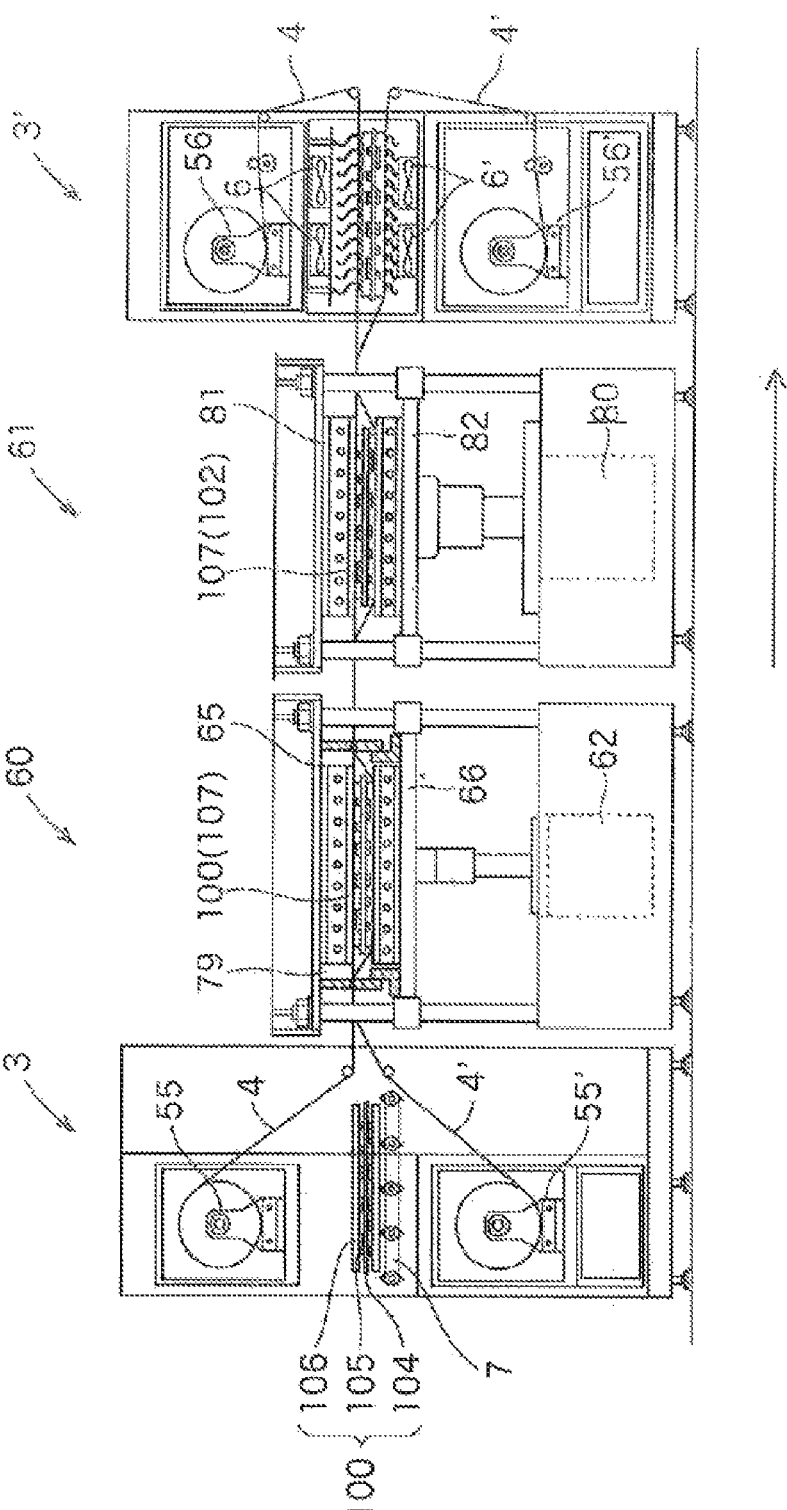
FIG. 5 is a schematic view illustrating a configuration of the laminating apparatus according to a second embodiment of the present disclosure.

Next, a second embodiment of the present disclosure is shown in FIG. 5.

Like the laminating apparatus shown in FIG. 1, a laminating apparatus shown in FIG. 5 is an apparatus for laminating an insulative layer made of the resin 106 to the base material 104 for a build-up board provided with irregularities due to interconnect lines or the like such as the copper pattern 105. This laminating apparatus includes the conveying devices 3 and 3' for sequentially conveying workpieces 100 by unwinding the conveying films 4 and 4' from one side and winding the conveying films 4 and 4' on the other side.

A vacuum laminating device 60 and a first flat press laminating device 61 are arranged in this order along a flow of an arrow of the conveying films 4 and 4'.

In the vacuum laminating device 60, the pressing force against a workpiece 100 in which the base material 104 has opposite irregular surfaces due to the arrangement of the copper pattern 105 and in which the resin 106 is placed on the irregular surfaces is generally set to less than 1.67 MPa per 500 mm square area. The vacuum laminating device 60 presses the workpiece 100 under reduced pressure with a hydraulic cylinder 62 to thereby form a second pre-laminate 107 in which the resin 106 adheres to and follows the irregularities formed on the surfaces of the base material 104 without gaps.

In the first flat press laminating device 61, the pressing force against the second pre-laminate 107 formed in the vacuum laminating device 60 is set in the range of 1.67 to 3.97 MPa per 500 mm square area, and a lower plate block 82 that is movable forwardly and backwardly has a buffer material 92 and a flexible metal plate (flat pressing plate) 93. The first flat press laminating device 61 presses the second pre-laminate 107 to fill the resin 106 along the irregularities of the base material 104 in the second pre-laminate 107. Even if the surfaces are irregular or the resin 106 does not sufficiently fills the recesses of the base material 104, the first flat press laminating device 61 causes the resin 106 to fill every corner of the recesses of the base material 104 to flatten the irregular surfaces of the second pre-laminate 107, thereby forming the first laminate 102 having a uniform thickness.

In FIG. 5, other parts are the same as in FIG. 1. These parts are designated by like reference numerals and characters, and the description thereof will be dispensed with.

The devices will be described hereinafter in detail.

[Vacuum Laminating Device 60]

Figure 6:
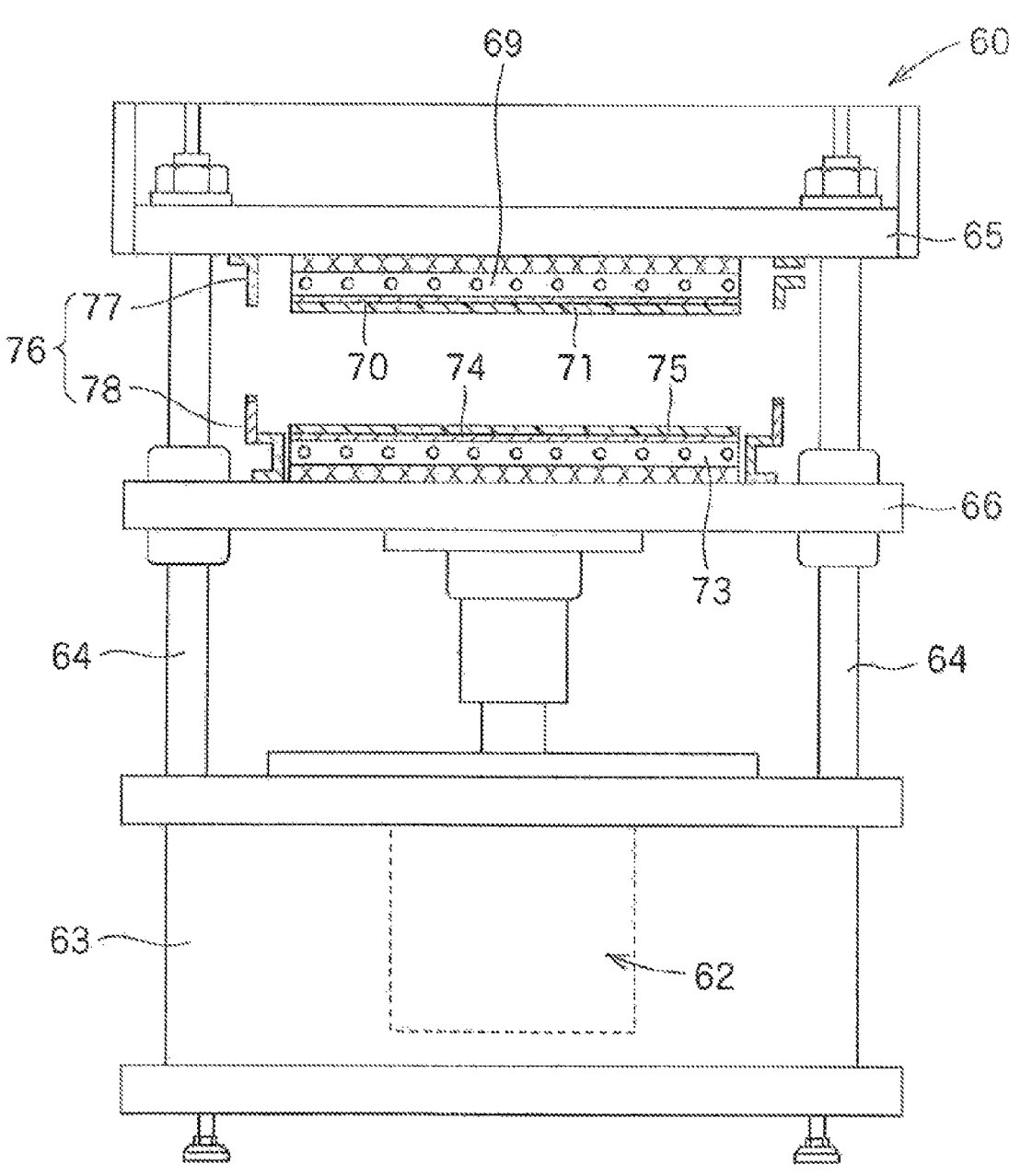
FIG. 6 is an illustration of the vacuum laminating device of the laminating apparatus of the second embodiment.

As shown in FIG. 6, the vacuum laminating device 60 includes: multiple support posts 64 provided upright on a press stand 63 (although only two support posts are shown in FIG. 6); an upper plate block 65 fixed to the support posts 64 with bolts, nuts, and other fixing members; a lower plate block 66 mounted movably upwardly and downwardly to the support posts 64; and the like. This lower plate block 66 is coupled to the hydraulic cylinder 62 via a joint 67, and is moved upwardly and downwardly by the operation of the hydraulic cylinder 62.

Although the hydraulic cylinder 62 is coupled to the lower plate block 66 in this embodiment, other elevating mechanisms such as an air cylinder may be used in place of the hydraulic cylinder 62. However, the use of the hydraulic cylinder 62 is preferable because the hydraulic cylinder 62 is compact and is capable of providing high pressure.

The pressing force of the vacuum laminating device 60 is not particularly limited, and may be set in the range of 1.67 to 3.97 MPa per 500 mm square area, which is the same as that of the vacuum laminating device 1 of FIG. 2, or may be less than 1.67 MPa.

A planar upper heating platen 69, an upper buffer material 70, and an upper elastic pressing plate 71 are fixed to the upper plate block 65 in this order from the top. A planar lower heating platen 73, a lower buffer material 74, and a lower elastic pressing plate 75 are fixed to the lower plate block 66 in this order from the bottom.

The upper and lower heating platens 69 and 73 have heating members provided therein in an appropriate arrangement and for heating the elastic pressing plates 71 and 75. However, the heating platens 69 and 73 are not essential components.

The laminating apparatus of the present disclosure is capable of sufficient lamination without excessive heating. On the other hand, the provision of the heating platens 69 and 73 is preferable because heating may reduce the tact time, depending on the material of the resin 106 used for lamination. When the heating platens 69 and 73 are provided, the heating members described above are not particularly limited, but examples thereof have multiple sheathed heaters arranged therein.

The heating platens 69 and 73 are optional components. However, when provided, the heating platens 69 and 73 are preferably heated by the heating members so as to reach 60 to 180° C., and more preferably heated at 90 to 130° C.

The elastic pressing plates 71 and 75 are not particularly limited, but examples thereof may be made of rubber with thickness variations set to not greater than 0.25 mm, as in the vacuum laminating device 1 shown in FIG. 2.

The vacuum laminating device 60 includes a movable vacuum frame 76. This movable vacuum frame 76 includes an upper fixed frame portion 77 in the form of a substantially rectangular frame fixed hermetically to a lower surface of the upper plate block 65, and a movable frame portion 78 fixed hermetically to an upper surface of the lower plate block 66. A vacuuming nozzle (not shown) is coupled to the upper fixed frame portion 77. When the upper and lower plate blocks 65 and 66 are in sealing engagement, this vacuuming nozzle is used to draw a vacuum in a sealed space portion 79 formed between the upper fixed frame portion 77 and the movable frame portion 78, thereby adjusting the pressure in the space portion 79 (into a state reduced to a predetermined pressure). The vacuuming nozzle may be coupled to the upper plate block 65, rather than the upper fixed frame portion 77. Further, the provision of such vacuuming nozzles in multiple locations allows the efficient adjustment of the pressure in the space portion 79.

[First Flat Press Laminating Device 61]

The first flat press laminating device 61 (referring again to FIG. 5) positions the second pre-laminate 107 conveyed from the vacuum laminating device 60 by the conveying films 4 and 4' between upper and lower plate blocks 81 and 82, and presses the second pre-laminate 107 with the upper and lower plate blocks 81 and 82 to smooth the surfaces of the second pre-laminate 107, thereby forming the first laminate 102.

Figure 7:
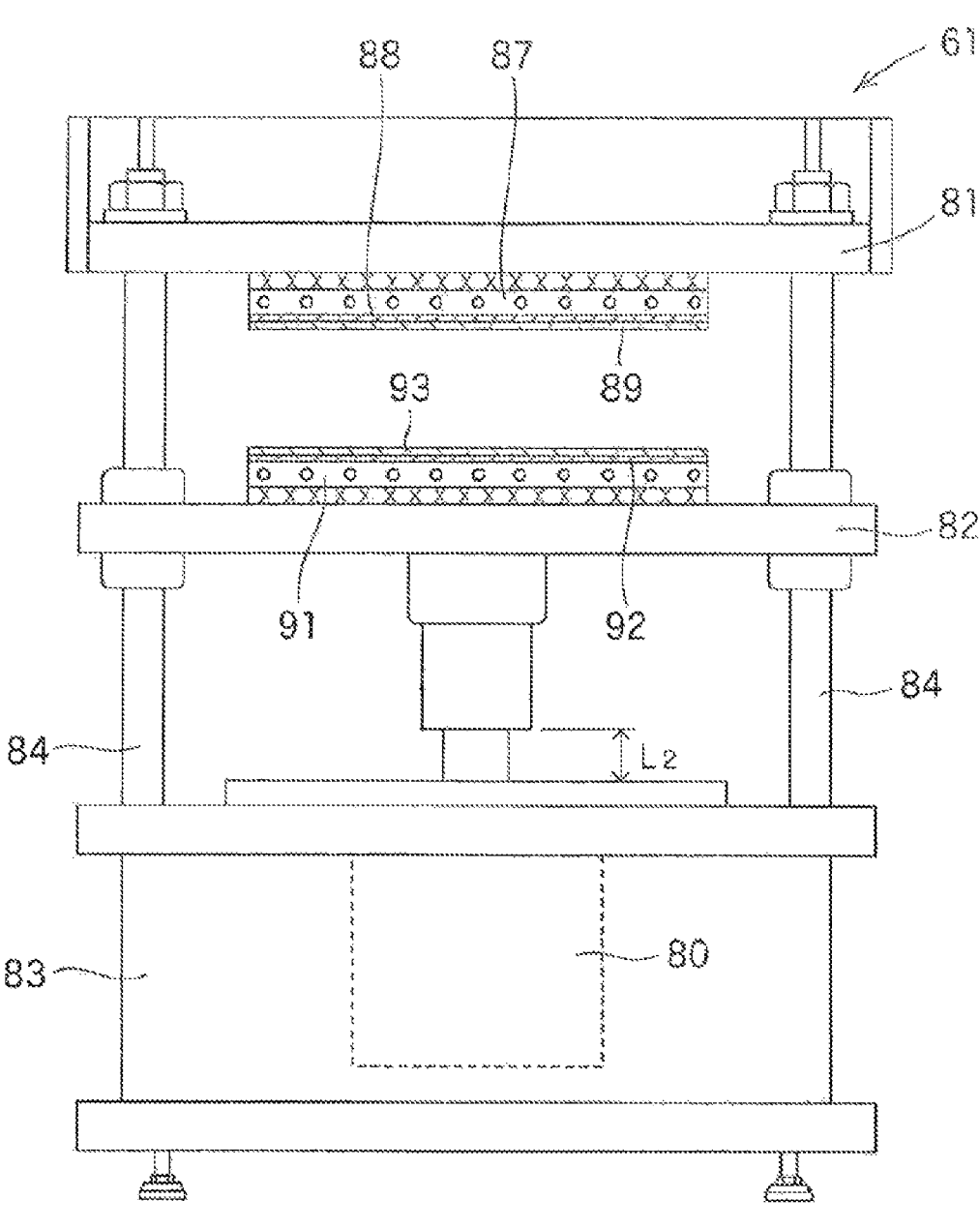
FIG. 7 is an illustration of the first flat press laminating device of the laminating apparatus of the second embodiment.

As shown in FIG. 7, the first flat press laminating device 61 in this embodiment includes: four support posts 84 provided upright on a press stand 83 (although only two support posts are shown in FIG. 7); the upper plate block 81 fixed to the support posts 84 with bolts, nuts, and other fixing members; the lower plate block 82 mounted movably upwardly and downwardly (forwardly and backwardly) to the support posts 84; and the like.

This lower plate block 82 has a hydraulic cylinder 80 coupled to a power source and a hydraulic pump (hydraulic unit), and is moved forwardly and backwardly (upwardly and downwardly) by the operation of the hydraulic cylinder 80.

Of the upper and lower plate blocks 81 and 82, the upper plate block 81 includes a planar upper heating platen 87, a planar upper buffer material 88, and an upper flexible metal plate 89, which are fixed in this order from the top. The lower plate block 82 includes a planar lower heating platen 91, the planar lower buffer material 92, and the lower flexible metal plate 93, which are fixed in this order from the bottom.

The buffer materials 88 and 92 deform in response to the deformation of the flexible metal plates 89 and 93 during pressing to enable the flexible metal plates 89 and 93 to press along the irregularities of the second pre-laminate 107. The material, thickness, and allowable range of thickness variations of the buffer materials 88 and 92 are generally selected as appropriate in accordance with the flexible metal plates 89 and 93.

The material of the flexible metal plates (plate-like bodies) 89 and 93 generally used includes stainless steel, iron, aluminum, aluminum alloys, or the like. Among these, stainless steel is preferably used because of its excellent resistance to rust. When the surfaces of the flexible metal plates (plate-like bodies) 89 and 93 are mirror polished by buffing or the like, the surfaces of the resulting second pre-laminate 107 are more mirror-finished.

The flexible metal plates 89 and 93 have a thickness generally in the range of 0.2 to 20 mm, preferably in the range of 0.2 to 10 mm, and more preferably in the range of 0.5 to 3 mm. If the thickness is in the range described above, flexibility is exhibited while the mechanical strength is ensured. This allows the flexible metal plates 89 and 93 to sufficiently follow the deformation of the buffer materials 88 and 92 as the buffer materials 88 and 92 follow the second pre-laminate 107.

The upper and lower heating platens 87 and 91 have heating members provided therein in an appropriate arrangement and for heating the flexible metal plates 89 and 93. However, the heating platens 87 and 91 are not essential components.

The laminating apparatus of the present disclosure is capable of sufficient lamination without excessive heating. On the other hand, it is preferable to provide the heating platens 87 and 91 because heating may reduce the tact time, depending on the material of the resin 106 used for lamination. When the heating platens 87 and 91 are provided, the heating members described above are not particularly limited, but examples thereof have multiple sheathed heaters arranged therein.

When the heating platens 87 and 91 are provided, it is preferable to provide a temperature control system for controlling the temperature of the heating platens 87 and 91.

The use of the temperature control system allows the pressing under constant temperature conditions without being affected by the ambient temperature, to thereby suppress the occurrence of variations in thickness from one pressing to another. This is also more efficient because the need to examine and change the pressing conditions is eliminated for each pressing.

The temperature control system may be of any type as long as the temperature control system is capable of controlling the temperature of the heating platens 87 and 91. An example of the temperature control system has a temperature sensor for measuring the temperature of the heating platens 87 and 91, a controller connected to a computer, or the like, and calculates a difference between temperature information obtained from the temperature sensor and a preset temperature to turn on/off a power supply of the heating members so that the preset temperature is reached.

The hydraulic cylinder 80 coupled to the hydraulic pump is used to power the lower plate block 82 in this embodiment. However, other elevating mechanisms such as a hydraulic motor connected to a hydraulic pump may be used which are capable of setting the pressing force against the second pre-laminate 107 to not less than 1.67 MPa per 500 mm square area. The use of a hydraulic cylinder coupled to a hydraulic pump is preferable because such a hydraulic cylinder is capable of strong pressing even when reduced in size.

The hydraulic cylinder 80 has a stroke length $L_2$ set preferably to not greater than 230 mm, and more preferably in the range of 150 to 200 mm. If the stroke length $L_2$ of the hydraulic cylinder 80 is set in the range described above, the replacement of a conventional laminating apparatus is allowed because the apparatus dimensions substantially the same as those of the conventional laminating apparatus are achieved. This eliminates the need for extra cost and space for arrangement and is hence preferable because the preparation of only the necessary apparatus is merely required.

The hydraulic cylinder 80 has a diameter set preferably to not less than 200 mm, and more preferably in the range of 200 to 270 mm. If the cylinder diameter of the hydraulic cylinder 80 is set in the range described above, the hydraulic cylinder 14 tends to easily achieve a stronger pressing force than ever before.

It is important that the pressing force against the second pre-laminate 107 between the pair of plate blocks 81 and 82 is set in the range of 1.67 to 3.97 MPa per 500 mm square area, preferably in the range of 2.0 to 3.5 MPa, and more preferably in the range of 2.5 to 3.5 MPa. The hydraulic cylinder 80 used in the present disclosure is also generally capable of pressing at less than 1.67 MPa per 500 mm square area.

If the pressing force against the second pre-laminate 107 is in the range described above, the resin 106 is allowed to fill every corner of the recesses of the base material 104 and to flatten the irregular surfaces of the second pre-laminate 107, thereby forming the first laminate 102 having a uniform thickness, even when the resin 106 does not sufficiently fills the recesses of the base material 104 in the second pre-laminate 107.

It is preferable that the laminating apparatus of the present embodiment includes a pressing control system for controlling the pressing force between the pair of plate blocks 81 and 82. The provision of the pressing control system allows the use of any elevating mechanism having a constant pressing force without any limitations. In addition, since the pressing force is more easily set within a desired range, a higher level of lamination, e.g. the application of an optimal pressing force in the light of temperature information during the pressing, is achieved.

The pressing control system may be of any type as long as the pressing control system is capable of controlling the pressing force between the pair of plate blocks 81 and 82. An example of the pressing control system has a sensor for detecting the hydraulic pressure from a hydraulic pump, a sensor for detecting the position of the hydraulic cylinder 80, a controller connected to a computer, or the like, and controls the opening and closing of a solenoid valve of the hydraulic pump controlled to apply a preset pressing force, based on information provided from the sensors.

The pressing by the first flat press laminating device 61 may be performed under atmospheric pressure or under reduced pressure. The pressing under atmospheric pressure shortens the tact time, and achieves lower costs because there is no need to provide a configuration for the pressing under reduced pressure.

On the other hand, the pressing under reduced pressure requires the provision of a configuration for the pressing under reduced pressure in the first flat press laminating device 61, but reduces the generation of voids through the use of a vacuum environment. In addition, even when a less flexible resin is used, the irregularities on the surfaces of the second pre-laminate 107 are further flattened, whereby the flatness of the surfaces of the resulting laminate is improved.

Figure 8:
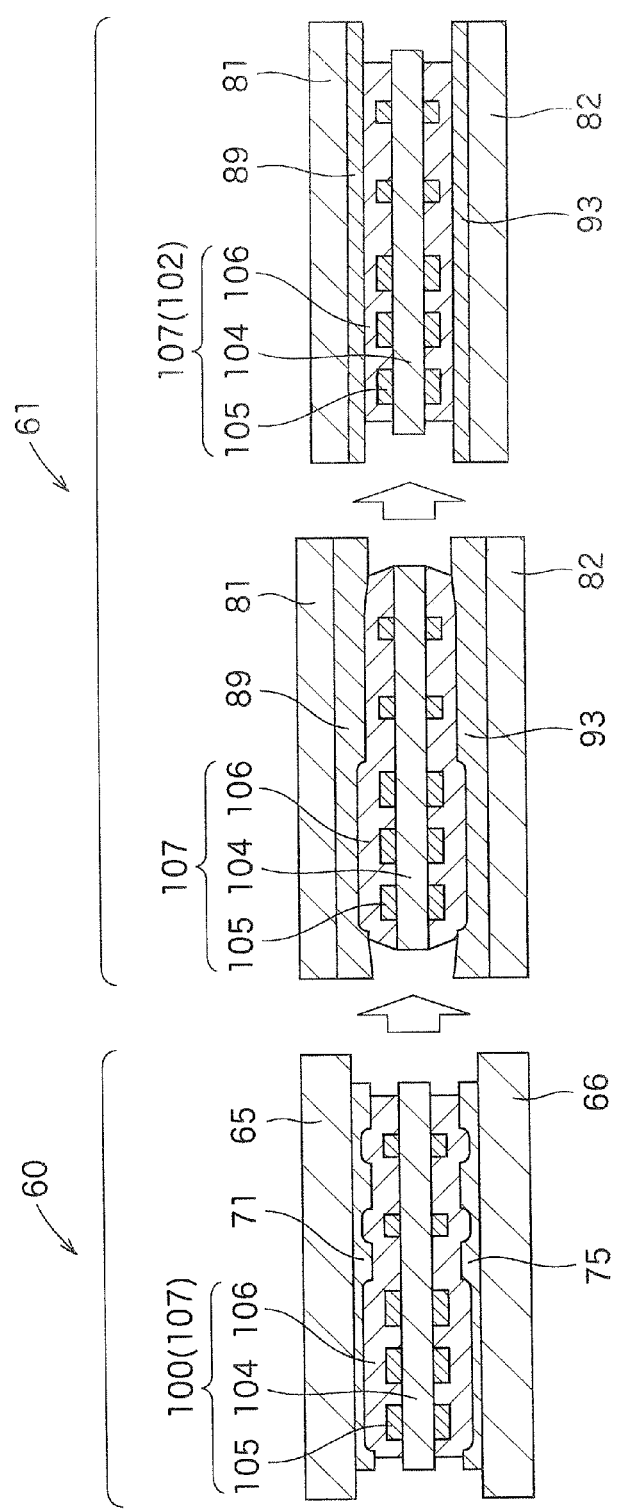
FIG. 8 is a view illustrating changes in lamination state of an object to be pressed in the vacuum laminating device and the first flat press laminating device in the laminating apparatus of the second embodiment.

According to the laminating apparatus described above, the forwardly and backwardly movable plate block 66 of the vacuum laminating device 60 has the lower buffer material 74 and the lower elastic pressing plate 75. The lower elastic pressing plate 75 is made of rubber. The workpiece 100 is pressed under vacuum between the pair of plate blocks. Thus, as shown in FIG. 8, the state of the resin 106 changes in the vacuum laminating device 60. This provides the second pre-laminate 107 in which the resin 106 adheres to and follows the irregularities of the base material 104. In FIG. 8, the range indicated by the reference numeral 60 shows a change in state of the workpiece 100 in the vacuum laminating device 60.

The second pre-laminate 107 is pressed by the flat surface of the flexible metal plate 93 of the first flat press laminating device 61, as indicated by the reference numeral 2 of FIG. 8, in the first flat press laminating device 61 with the force set in the range of 1.67 to 3.97 MPa per 500 mm square area kept flat of the flat surfaces. This provides the first laminate 102 in which the surface irregularities are further eliminated and the surfaces are flattened into mirror surfaces and in which a small amount of resin 106 is forced out. In FIG. 8, the range indicated by the reference numeral 61 shows a change in state of the second pre-laminate 107 in the first flat press laminating device 61.

In this manner, this embodiment initially produces the second pre-laminate 107 in which the resin 106 adheres to and follows the irregularities of the base material 104, and then presses the second pre-laminate 107 at high pressure to produce the first laminate 102 in a short time. This shortens the tact time while maintaining a high level of flatness of the resulting first laminate 102. Thus, more first laminates 102 are manufactured in a short time. Even if the resin 106 does not sufficiently fills the recesses of the base material 104 in the second pre-laminate 107, the resin 106 is allowed to fill every corner of the recesses of base material 104. This suppresses the generation of voids even when not only conventional film-type resin but also powder-type resin is used as the resin 106, and achieves the lamination with an extremely high level of surface flatness. Further, whereas there has been a need to excessively heat the resin 106 for the purpose of reducing the tact time, this embodiment eliminates the need for such heating. Thus, the resin 106 is not adversely affected by thermal curing, but fully exhibits its original properties.

The figures in FIG. 8 schematically show the process and the apparatus, with portions not necessary for illustration dispensed with.

Figure 9A:
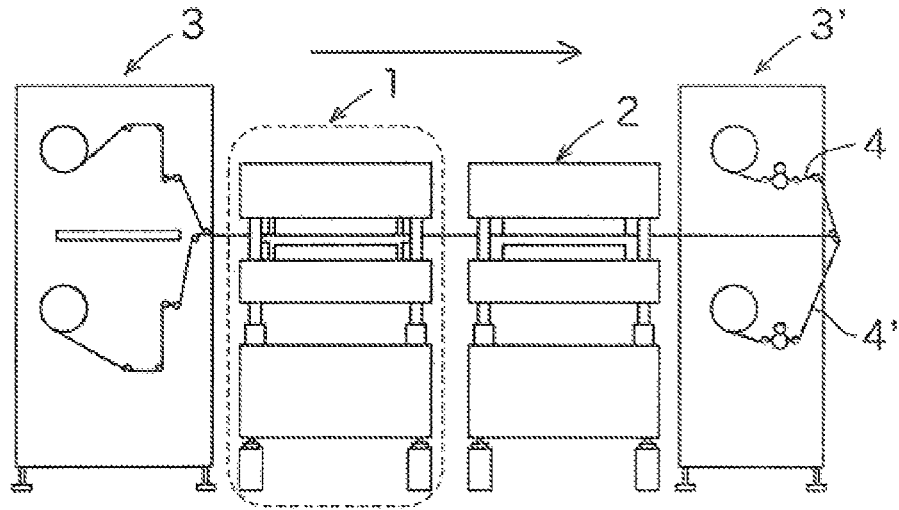
FIGS. 9A to 9C are views illustrating variations in configuration of the embodiments of the present disclosure.
Figure 9B:
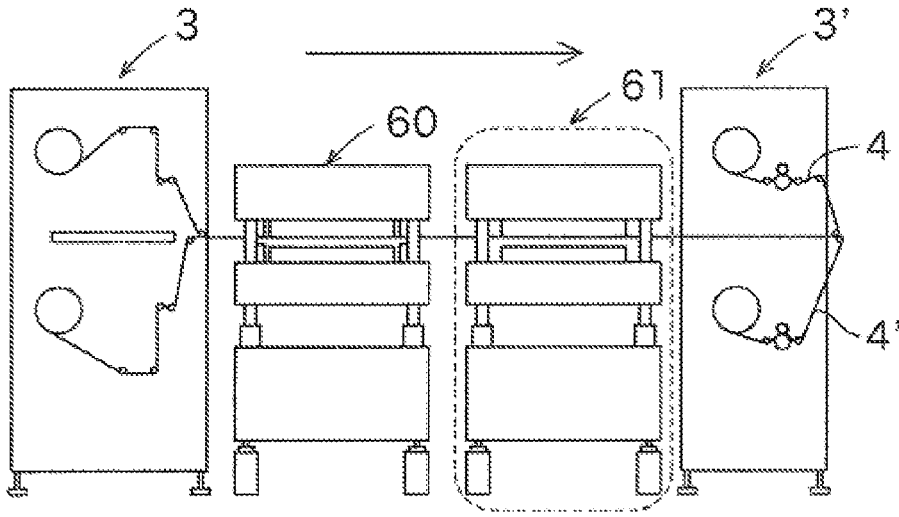
Figure 9C:
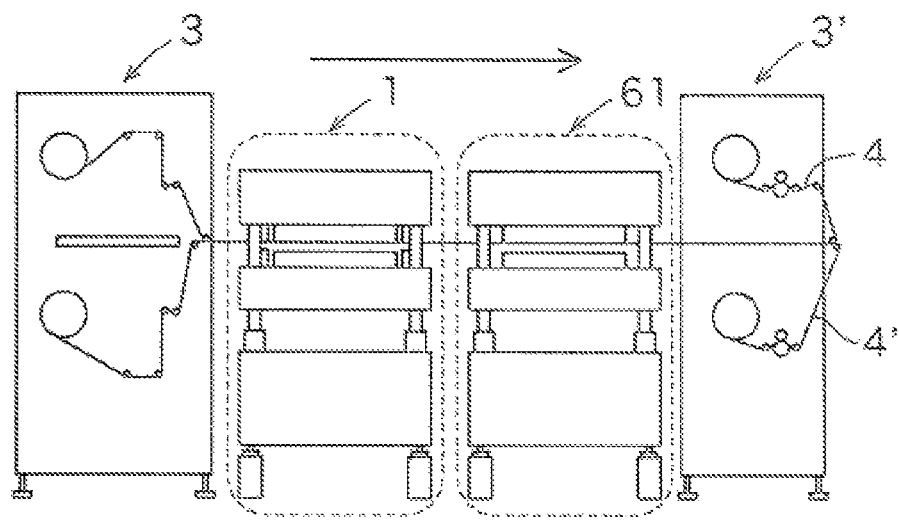

Further, the laminating apparatus of the present disclosure may be configured, for example, such that one of the vacuum laminating device 1 and the first flat press laminating device 61 has a distinctive configuration, as shown in FIGS. 9A and 9B, or such that both of the vacuum laminating device 1 and the first flat press laminating device 61 have a characteristic configuration, as shown in FIG. 9C (where portions of the apparatus having the feature of the present disclosure are surrounded by broken lines).

Also, the laminating apparatus of the present disclosure may be obtained by manufacturing the entire apparatus anew or in combination with existing apparatuses.

Specifically, in the examples shown in FIGS. 9A to C, the vacuum laminating device and/or the first flat press laminating device of the existing laminating apparatus may be replaced with the portions (surrounded by broken lines) for use in the present disclosure.

Figure 10:
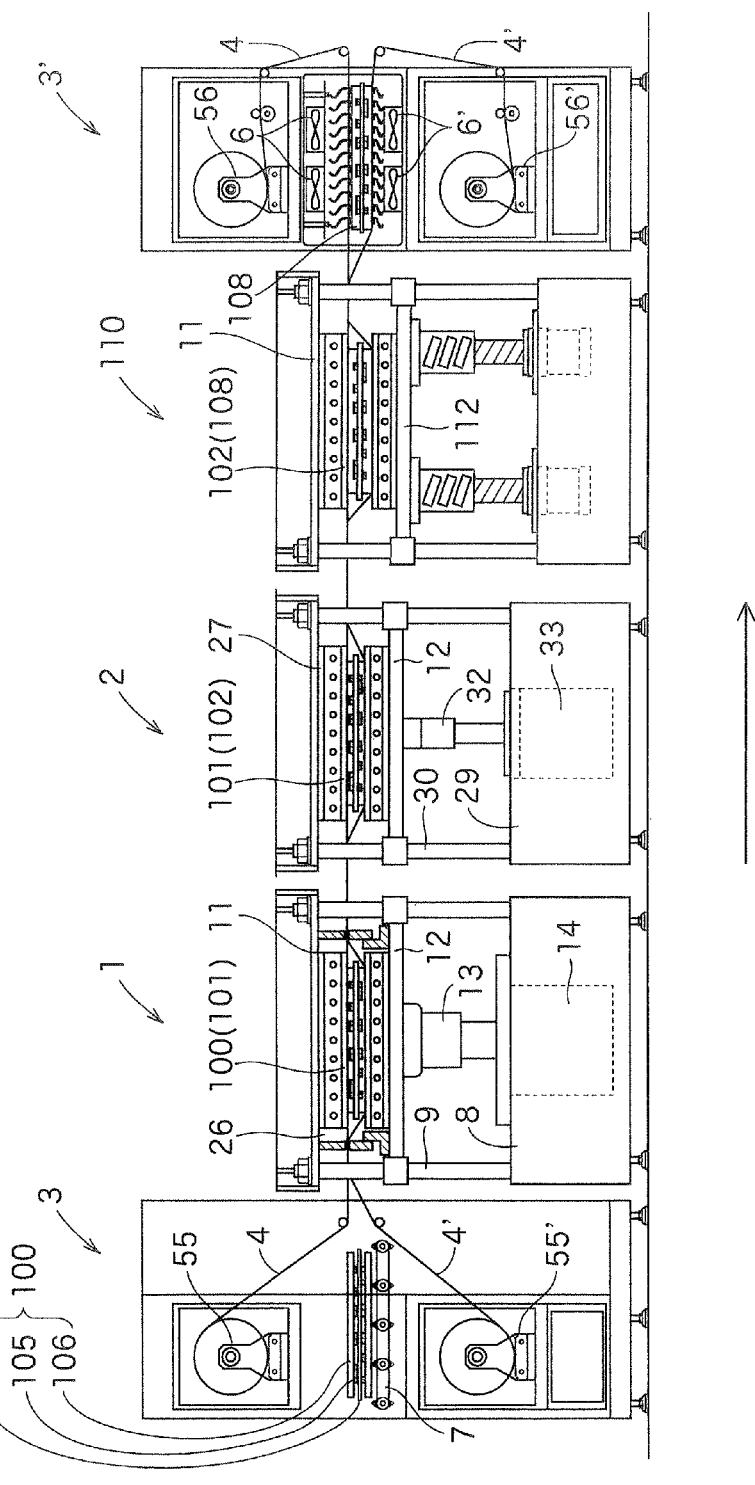
FIG. 10 is a schematic view illustrating a configuration of the laminating apparatus according to a third embodiment of the present disclosure.

A third embodiment of the present disclosure is shown in FIG. 10. In this embodiment, a second flat press laminating device 110 is further provided downstream of the first flat press laminating device 2 of the laminating apparatus shown in FIG. 1, so that the first laminate 102 conveyed via the first flat press laminating device 2 is pressed by the second flat press laminating device 110 under different conditions from those of the first flat press laminating device 2 to provide a second laminate 108 with the irregular surfaces further flattened.

Figure 11:
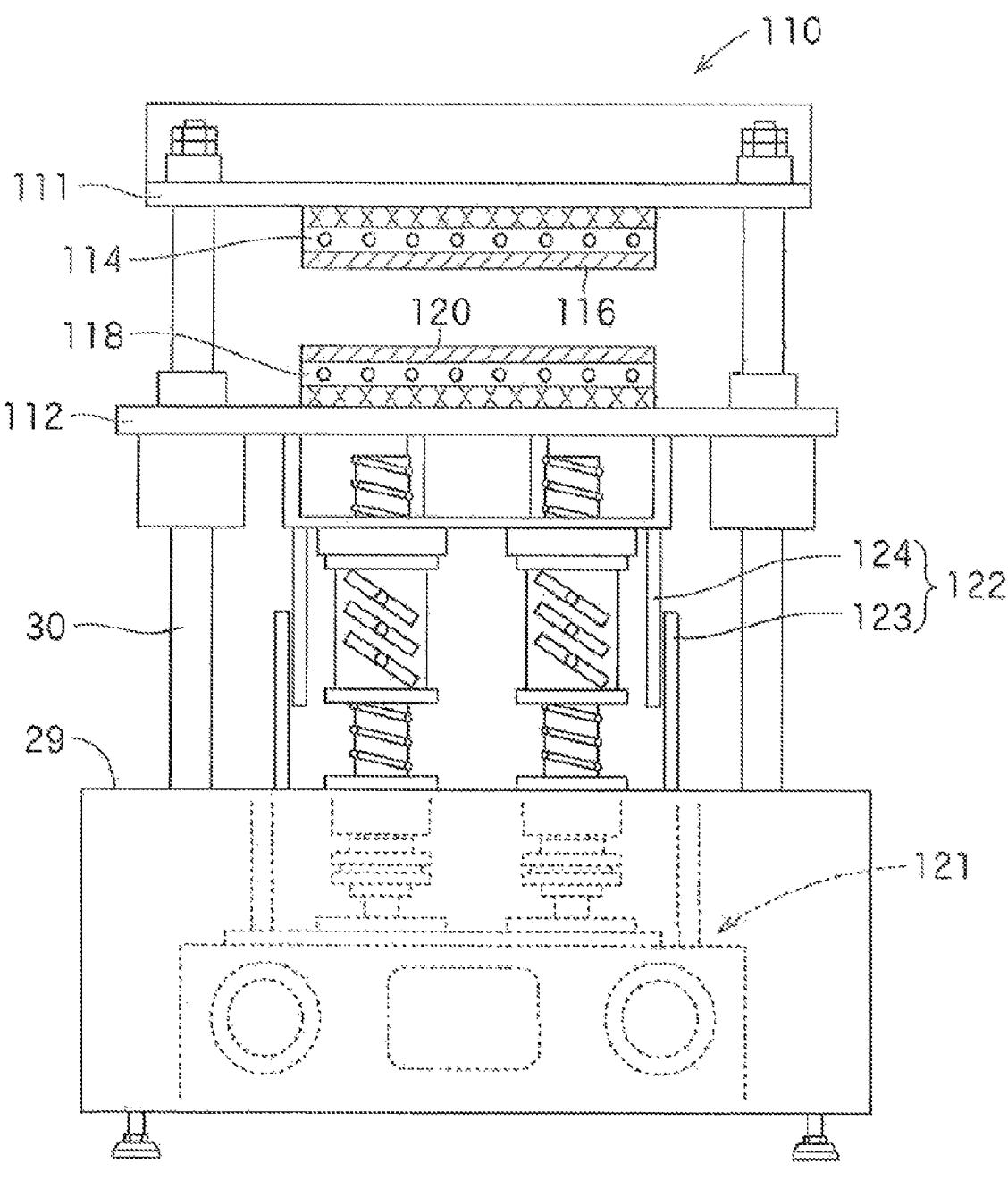
FIG. 11 is an illustration of a second flat press laminating device of the laminating apparatus of the third embodiment.

In the second flat press laminating device 110, as shown in FIG. 11, heating platens 114 and 118 containing heaters are mounted to the inside (press side) of an upper plate block 111 and a lower plate block 112, and metal plates (flat pressing plates) 116 and 120 are provided further inside (press side) of the heating platens 114 and 118. The first laminate 102 formed via the first flat press laminating device 2 is pressed between the metal plates (flat pressing plates) 116 and 120. This makes the thickness of the first laminate 102 uniform and provides mirror surfaces to form the second laminate 108 having flat surfaces.

As shown in FIG. 11, the second flat press laminating device 110 includes no buffer materials provided on the inside (press side) of the heating platens 114 and 118 of the plate blocks 111 and 112. Thus, the flatness of the metal plates (plate-like bodies) 116 and 120 is more reliably transferred to the first laminate 102, so that the second laminate 108 with a more mirror-like flat surface finish is provided.

Depending on the type of the base material 104 and the resin 106, buffer materials may be provided between the heating platens 114 and 118 and the metal plates (plate-like bodies) 116 and 120. In that case, it is preferable that the buffer materials are smaller in buffer effect than the buffer materials used in the first flat press laminating device 61. The magnitude of the buffer effect is generally determined by the material and thickness of the buffer materials. In addition, followability is used as one of the indicators of the buffer effect in the present disclosure. In other words, buffer materials with high followability are assumed to have a large buffer effect.

When the buffer materials are provided in the second flat press laminating device 110, the buffer materials have a surface Shore A hardness preferably not less than 60 degrees, and more preferably in the range of 65 to 75 degrees. If the surface Shore A hardness of the buffer materials is in the range described above, the thickness of the resin 106 of the resulting second laminate 108 tends to be more uniform.

When the buffer materials are provided, the buffer materials have a thickness generally in the range of 0.2 to 20 mm, preferably in the range of 0.2 to 3 mm, and more preferably in the range of 0.2 to 1 mm. When the buffer materials have a buffer effect smaller than that of the buffer materials 88 and 92 of the first flat press laminating device 61, the flatness of the metal plates (flat pressing plates) 116 and 120 is transferred more reliably, so that the second laminate 108 with flatter surfaces is provided. The material of the buffer materials used herein may be the same as that in the first flat press laminating device 61, and is preferably synthetic resin, and a combination of synthetic resin and other materials.

The metal plates (plate-like bodies) 116 and 120 mounted to the inside (press side) of the plate blocks 111 and 112 have a thickness generally in the range of 0.1 to 10 mm, preferably in the range of 0.5 to 7 mm, more preferably in the range of 1 to 5 mm, and further preferably in the range of 2 to 5 mm. If the thickness of the metal plates (plate-like bodies) 116 and 120 is in the range described above, the thickness of the first laminate 102 is made more uniform because of their excellent mechanical strength, and the second laminate 108 with flatter surfaces is provided. When the surfaces of the metal plates (plate-like bodies) 116 and 120 are mirror polished by buffing or the like, it is more preferable because the surfaces of the second laminate 108 are more uniformly mirror-finished.

The material of the metal plates (plate-like bodies) 116 and 120 generally used includes stainless steel, iron, aluminum, aluminum alloys, or the like. Among these, stainless steel is preferably used because of its excellent resistance to rust.

The metal plates (plate-like bodies) 116 and 120 may or may not be flexible. However, when buffer materials are used, the metal plates (flat pressing plates) 116 and 120 are preferably less flexible so that the buffer materials do not exhibit the buffer effect too much.

An elevating portion including a servo motor 121 and the like is provided in the space under the lower plate block 112. The RPM of the servo motor 121 is controlled by a servo amplifier (not shown), based on a command signal from a programmable logic controller (PLC) and distance information between the plate blocks 111 and 112 fed back. Thus, the lower plate block 112 is controlled so as to freely move upwardly and downwardly by controlling the rotational motion of the servo motor 121.

A linear scale 122 for measuring the distance between the lower plate block 112 and the press stand 29 is further provided in the space under the lower plate block 112. This linear scale 122 includes a scale 123 fixed to the press stand 29 and an encoder head 124 mounted to the plate block 112 and moving upwardly and downwardly in synchronism with the plate block 112. This linear scale 122 indirectly measures the distance (gap) between the lower plate block 112 moving upwardly and downwardly with the rotational motion of the servo motor 121 and the upper plate block 111. In the present disclosure, the servo motor means a motor provided with a servo mechanism, and there is no limitation on the use thereof.

For example, any type of linear scale (linear encoder) such as a magnetic type having a magnetic head or an optical type having light-emitting and light-receiving elements may be used as the linear scale 122. Further, other styles of distance meters capable of measuring the gap between the plate blocks 111 and 112 directly or indirectly in a contacting or non-contacting manner may be used in place of the linear scale 122.

The linear scale 122 can be provided so as to be able to directly measure the gap between the lower plate block 112 and the upper plate block 111. However, if the linear scale 122 is provided between the plate blocks 111 and 112, the linear scale 122 might be affected by heat from the heating platens 114 and 118. There is a danger that the accurate measurement of the gap is difficult without the consideration for heat. For this reason, the linear scale 122 is preferably provided in spaced apart relation to the heating platens 114 and 118, e.g. under the lower plate block 112 as in this example, so as to measure the distance between the lower plate block 112 and the press stand 29, thereby indirectly measuring the gap between the lower plate block 112 and the upper plate block 111.

The second flat press laminating device 110 includes a servo amplifier (not shown) for controlling the rotational motion of the servo motor 121, based on a command signal from a PLC and the feedback of distance information between the plate blocks 111 and 112. The gap between the plate blocks 111 and 112 is controlled by a pressing gap control system set in consideration for a distance signal obtained from the linear scale 122, rather than based solely on the command signal (pressing gap control program) incorporated in the PLC. That is, the rotational motion of the servo motor 121 operated by the command signal from the PLC is controlled by the feedback of the distance information between the plate blocks 111 and 112 sent from the linear scale 122. In this example, the command signal from the PLC causes the servo motor 121 to rotate, thereby moving the plate block 112 upwardly. When the gap between the plate blocks 111 and 112 (the distance information between the plate blocks 111 and 112 sent from the linear scale 122) reaches a set value, information indicating that the set value is reached is fed back to the command signal incorporated in the PLC, so that the rotation of the servo motor 121 is slowed or stopped. This allows the stop position of the plate block 112 to be set more accurately, thereby setting the gap between the plate blocks 111 and 112 more accurately.

The second flat press laminating device 110 may use other pressing devices such as a hydraulic cylinder, rather than the servo motor 121, for the pressing. When the pressing is performed by a hydraulic cylinder, it is preferable that the second flat press laminating device 110 includes a control system capable of controlling the pressing force.

In this embodiment, the temperature and pressing force during the pressing in the first flat press laminating device 2 and the second flat press laminating device 110 are selectable as appropriate in accordance with the materials of the base material 104 and the resin 106. In particular, it is preferable that the pressing conditions of the first flat press laminating device 2 is higher in temperature and lower in pressure than those of the second flat press laminating device 110 in terms of excellent finish (flatness and mirror surfaces) of the second laminate 108. It is also preferable that the pressing time of the second flat press laminating device 110 is longer than that of the first flat press laminating device 2.

Figure 12A:
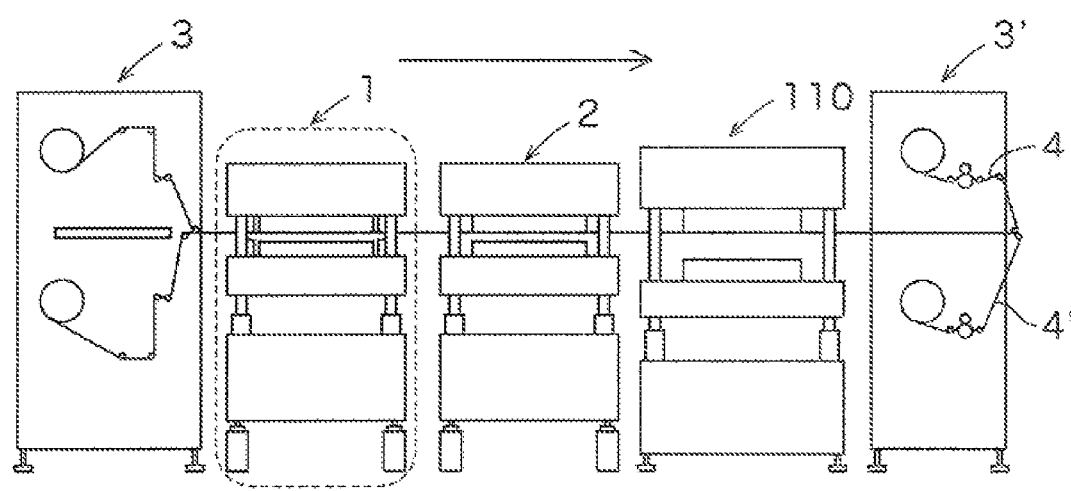
FIGS. 12A and 12B are views illustrating variations in configuration of the embodiments of the present disclosure.
Figure 12B:
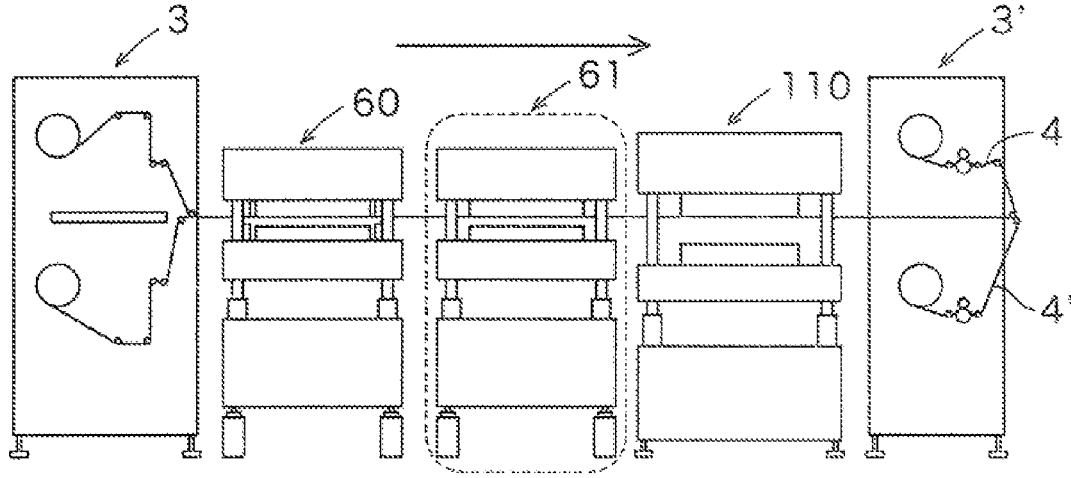
Figure 13:
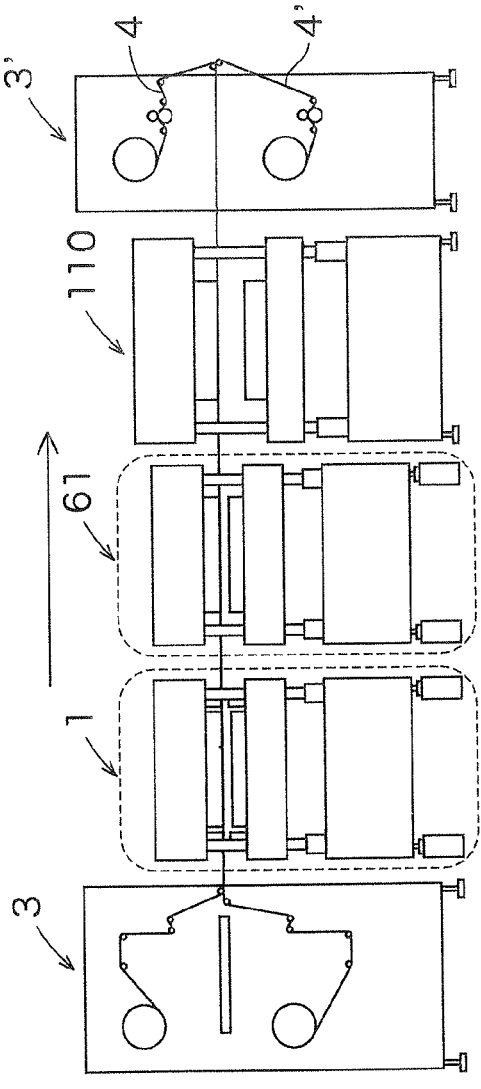
FIG. 13 is a view illustrating variations in configuration of the embodiments of the present disclosure.

The embodiment described above shows an example in which the second flat press laminating device 110 is provided downstream of the laminating devices of FIG. 1 (with reference to FIG. 12A). However, as shown in FIG. 12B, the second flat press laminating device 110 may be provided downstream of the laminating devices of FIG. 5. Alternatively, the second flat press laminating device 110 may be provided in an apparatus including the vacuum laminating device 1 and the first flat press laminating device 61, as shown in FIG. 13 (where portions having the feature of the present disclosure are surrounded by broken lines).

EXAMPLES

The present disclosure will be further described using the following examples. It should be noted that the present disclosure is not interpreted as limited by the examples illustrated below.

In the examples, "%" means a mass standard.

Example 1

The laminating apparatus shown in FIG. 1 was used.

The workpiece 100 was produced by placing epoxy resin 106 in the form of a film (with a thickness of 22.5 μm) on the base material 104 (having protrusions with a thickness of 18 μm, an α part with a copper pattern remaining copper rate of 80%, a β part with a copper pattern remaining copper rate of 30%, and a γ part with a copper pattern remaining copper rate of 0%) having irregularities (the copper pattern 105) on its surfaces. The resin 106 has a low dielectric loss tangent for high frequency, but has difficulties in resin fluidity by heating.

The space portion 26 was previously adjusted to 110° C. by the upper heating platen 16 and the lower heating platen 20 of the vacuum laminating device 1, and the pressure in the space portion 26 30 seconds after the start of suction was set to not greater than 100 Pa. The workpiece 100 was pressed for 30 seconds at 2.5 MPa per 500 mm square area between the upper elastic pressing plate 18 and the lower elastic pressing plate 22 which were made of silicone rubber with a thickness of 3 mm and a thickness variation of 0.2 mm, whereby the first pre-laminate 101 was produced. A laminate with a thickness of 2.6 mm and comprised of five layers [aramid fiber (fiber layer)/silicone rubber (rubber layer)/aramid fiber (fiber layer)/silicone rubber (rubber layer)/aramid fiber (fiber layer)] laminated so that cloth was placed on surfaces was used as the upper buffer material 17 and the lower buffer material 21 of the vacuum laminating device 1. The stroke length of the hydraulic cylinder 14 of the vacuum laminating device 1 was 200 mm.

In the first flat press laminating device 2, a stainless steel plate-like body with a thickness of 2 mm was used as the upper flexible metal plate (flat pressing plate) 36 and the lower flexible metal plate (flat pressing plate) 40, and vinylidene fluoride rubber (VDF) with a thickness of 2.5 mm was used as the upper buffer material 35 and the lower buffer material 39. Then, the upper heating platen 34 and the lower heating platen 38 were adjusted to 120° C., and the lower plate block 28 was moved upwardly by the hydraulic cylinder 32. The first pre-laminate 101 was hot-pressed for 40 seconds at 0.8 MPa per 500 mm square area with the upper flexible metal plate (flat pressing plate) 36 and the lower flexible metal plate (flat pressing plate) 40, whereby the first laminate 102 was produced.

Reference Example 1

The laminating apparatus shown in FIG. 5 was used.

The workpiece 100 was produced by placing the same resin 106 as in Example 1 on the base material 104 (having protrusions with a thickness of 18 μm, an α part with a copper pattern remaining copper rate of 80%, a β part with a copper pattern remaining copper rate of 30%, and a γ part with a copper pattern remaining copper rate of 0%) having irregularities (the copper pattern 105) on its surfaces.

The space portion 79 was previously adjusted to 150° C. by the upper heating platen 69 and the lower heating platen 73 of the vacuum laminating device 60, and the pressure in the space portion 79 30 seconds after the start of suction was set to not greater than 100 Pa. The workpiece 100 was pressed for 30 seconds at 1 MPa per 500 mm square area between the upper elastic pressing plate 71 and the lower elastic pressing plate 75 which were made of silicone rubber with a thickness of 3 mm and a thickness variation of 0.2 mm, whereby the second pre-laminate 107 was produced. The same five-layer laminate as in the vacuum laminating device 1 of Example 1 is used as the upper buffer material 70 and the lower buffer material 74 of the vacuum laminating device 60.

In the first flat press laminating device 61, a stainless steel plate-like body with a thickness of 2 mm was used as the upper flexible metal plate (flat pressing plate) 89 and the lower flexible metal plate (flat pressing plate) 93, and vinylidene fluoride rubber (VDF) with a thickness of 2.5 mm was used as the upper buffer material 88 and the lower buffer material 92. Then, the upper heating platen 87 and the lower heating platen 91 were adjusted to 120° C., and the lower plate block 82 was moved upwardly by the hydraulic cylinder 80. The second pre-laminate 107 was pressed for 40 seconds at 2 MPa per 500 mm square area with the upper flexible metal plate (flat pressing plate) 89 and the lower flexible metal plate (flat pressing plate) 93, whereby the first laminate 102 was produced. The stroke length of the hydraulic cylinder 80 of the first flat press laminating device 61 was 200 mm.

Example 2

The laminating apparatus shown in FIG. 10 was used.

The second laminate 108 was produced in the same manner as in Example 1 except that the second flat press laminating device 110 was provided downstream of the laminating devices of Example 1 (FIG. 1).

The second flat press laminating device 110 had no buffer materials. The heating platens 114 and 118 were adjusted to 100° C. The lower plate block 112 was moved upwardly by the servo motor 121. The distance between the metal plates (flat pressing plates) 116 and 120 comprised of a stainless steel plate-like body (with a thickness of 2 mm) having press surfaces with a flatness set within 10 μm was set so as to be 20 μm less than the thickness of the second pre-laminate 107. Pressing was performed for 40 seconds to produce the second laminate 108.

Example 3

The second laminate 108 was produced in the same manner as in Example 2 except that the first flat press laminating device 61 used in Reference Example 1 was used in place of the first flat press laminating device 2 of Example 2.

Example 4

The second laminate 108 was produced in the same manner as in Example 3 except that the pressing time of the workpiece 100 was 10 seconds in Example 3.

Comparative Example 1

The laminating apparatus employing the vacuum laminating device 60 shown in FIG. 6 in place of the vacuum laminating device 1 in the laminating apparatus shown in FIG. 1 was used, and the configuration and pressing conditions in this vacuum laminating device 60 were the same as those in Reference Example 1, whereby the first laminate 102 was produced.

Specifically, in Comparative Example 1, the pressing force between the plate blocks is less than 1.67 MPa per 500 mm square area in both the vacuum laminating device 60 and the first flat press laminating device 2.

The first laminate 102 or the second laminate 108 obtained in Examples 1 to 4, Reference Example 1, and Comparative Example 1 were evaluated for "presence/absence of void generation" and "thickness variation" using indices to be described below.

[Presence/Absence of Void Generation]

Each laminate (102 or 108) was observed from the surface side through a microscope with a magnification of 250×, and checked for internal voids generated therein. The results were listed in TABLE 1 below.

Excellent: No voids are generated.

Very good: A very small number of voids are generated, but the laminates are not adversely affected.

Poor: A large number of voids are generated.

[Thickness Variation]

The thicknesses of portions of each laminate (102 or 108) corresponding to parts (α, β, and γ parts) different from each other in the copper pattern (remaining copper rate) were measured, and a difference between the maximum and minimum thicknesses was calculated. The calculated value was applied to indices to be described below and evaluated. The results were listed in TABLE 1 below.

Excellent: Not greater than 5 μm.

Very good: Greater than 5 μm and not greater than 10 μm.

Good: Greater than 10 μm and not greater than 15 μm.

Poor: Greater than 15 μm.

As shown in TABLE 1, Example 1 showed that no void generation was observed in the resulting laminate because the pressing force between the pair of plate blocks 11 and 12 of the vacuum laminating device 1 was 2.5 MPa per 500 mm square area.

In Reference Example 1, a small number of voids were generated even though the process was performed at a higher temperature than in Example 1 because the pressing force between the pair of plate blocks 11 and 12 of the vacuum laminating device 1 was 1.0 MPa per 500 mm square area. However, the thickness variation of the resulting laminate was small because the pressing force between the pair of plate blocks 81 and 82 of the first flat press laminating device 61 was 2.0 MPa per 500 mm square area.

In Examples 2 to 4, almost no thickness variation of the resulting laminates was found because of the further provision of the second flat press laminating device 110, and the suppression of void generation was excellent. In particular, in Examples 3 and 4, more excellent laminates were obtained, and both the thickness variation and void generation were effectively suppressed.

In addition, the vacuum laminating device in Example 4 was able to reduce the pressing time to approximately ⅓ of the conventional pressing time.

On the other hand, in Comparative Example 1, the thickness variation of the resulting laminate and the void generation were observed because the pressing forces between the plate blocks of the vacuum laminating device 60 and the first flat press laminating device 2 were 1 MPa and 0.8 MPa per 500 mm square area which were the same as conventional pressing forces.

Example 5

Next, for the evaluation of the uniformity of pressing due to differences in buffer materials, the vacuum laminating device 1 of Example 1 was initially used to press a workpiece to be described below under the following conditions: a temperature of 110° C., vacuum time of 30 seconds, a pressing force of 2.5 MPa per 500 mm square area, and pressing time of 20 seconds, whereby a first pre-laminate 130 was produced.

Workpiece: Epoxy resin in the form of a film with a thickness of 22.5 μm placed on a Cu-patterned substrate in

TABLE 1

| | Configuration of laminating apparatus | | | | | |
|---|---|---|---|---|---|---|
| | Pressing force of vacuum laminating device (per 500 mm square area) (MPa) | Pressing time of vacuum laminating device (sec) | Pressing force of first flat press laminating device (per 500 mm square area) (MPa) | Second flat press laminating device | Evaluation | |
| | | | | | Presence/ absence of void generation | Thickness variation |
| Ex. 1 | 2.5 | 30 | 0.8 | Absent | Excellent | Good |
| Ref. Ex. 1 | 1 | 30 | 2 | Absent | Very good | Very good |
| Ex. 2 | 2.5 | 30 | 0.8 | Present | Excellent | Very good |
| Ex. 3 | 2.5 | 30 | 2 | Present | Excellent | Excellent |
| Ex. 4 | 2.5 | 10 | 2 | Present | Excellent | Excellent |
| Comp. Ex. 1 | 1 | 30 | 0.8 | Absent | Poor | Poor | the form of a 500-mm square (the substrate is faced with 40-mm square test coupons with identical Cu patterns in an 11×11 arrangement).

Example 6

The workpiece was pressed in the same manner as in Example 5 except that a buffer material comprised of a single layer of silicone rubber with a thickness of 2.6 mm was used in place of the buffer materials of the vacuum laminating device 1 of Example 5, whereby a first pre-laminate 131 was produced.

Comparative Example 2

The workpiece was pressed in the same manner as in Example 6 except that the pressing conditions of Example 6 were changed to a temperature of 150° C., vacuum time of 30 seconds, a pressing force of 1.0 MPa per 500 mm square area, and pressing time of 30 seconds, whereby a first pre-laminate 132 was produced.

The workpieces (the first pre-laminates 130, 131, and 132) obtained in Examples 5 and 6 and Comparative Example 2, which were subjected to the pressing in the vacuum laminating device 1, were taken out. Each of the workpieces was observed from the outside through a microscope with a magnification of 250×, and checked for internal voids generated therein. The results were shown in FIGS. 14 to 16. In these figures, a number in each box indicates the number of voids present in each coupon.

Figure 14:
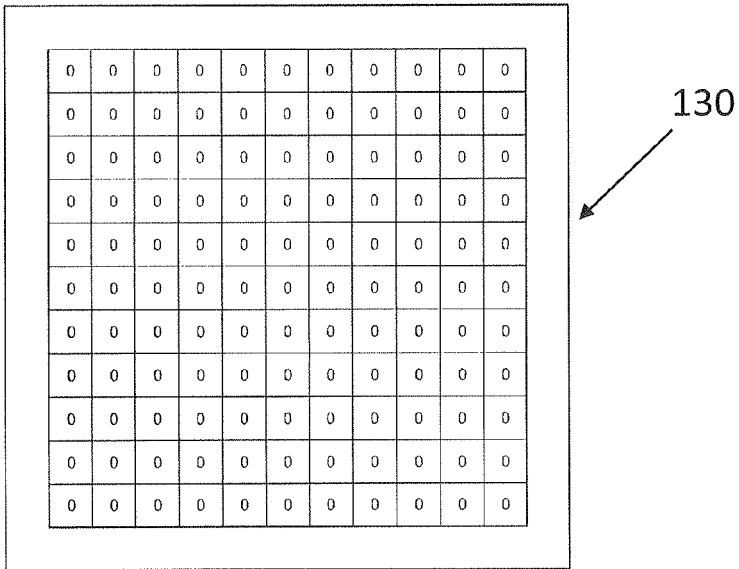
FIG. 14 is a view showing a result of Example 6.
Figure 15:
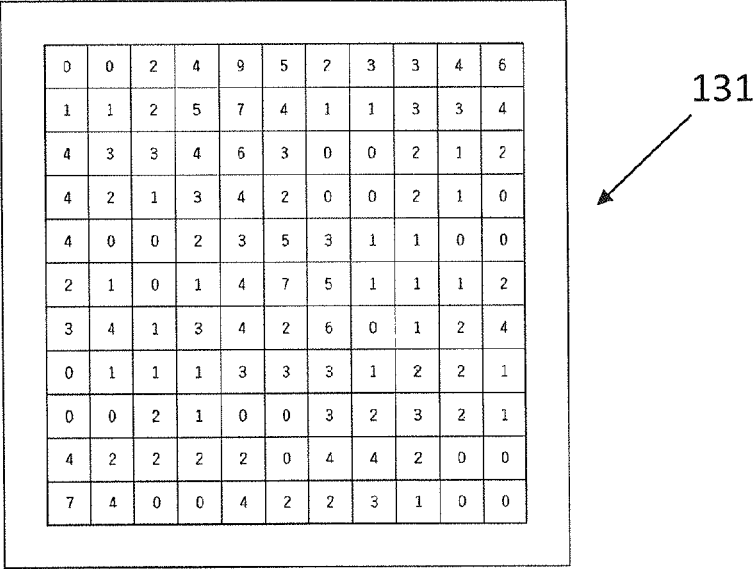
FIG. 15 is a view showing a result of Example 7.

As shown in FIG. 14, the generation of voids was not found at all in Example 5, which showed that the pressing against the workpiece was uniform. As shown in FIG. 15, the generation of voids was partially found in Example 6, which showed that the pressing against the workpiece was uneven. However, such amounts of voids are eliminated, for example, by adjusting the temperature during the pressing in the vacuum laminating device 1 or by pressing in the next flat press laminating device 2.

As shown in FIG. 16, on the other hand, the pressing against the workpiece is more uneven in Comparative Example 2. Moreover, a large number of voids were generated because the pressing force was 1.0 MPa per 500 mm square area, which was the same as the conventional pressing. In addition, because of the pressing at a high temperature of 150° C., the voids generated once were not able to be reduced by the temperature adjustment, and were not able to be reduced by the pressing in the next flat press laminating device 2.

Although specific forms in the present disclosure have been described in the examples, the examples should be considered as merely illustrative and not restrictive. It is contemplated that various modifications evident to those skilled in the art could be made without departing from the scope of the present disclosure.

The present disclosure is usable as a laminating apparatus capable of precisely laminating a base material and resin.

REFERENCE SIGNS LIST

1 Vacuum laminating device
2 First flat press laminating device
11 Plate block
12 Plate block
21 Buffer material
22 Elastic pressing plate
101 First pre-laminate

102 First laminate
104 Base material
106 Resin

The invention claimed is:

1. A laminating apparatus for laminating resin to a base material to form a laminate, comprising:
   a vacuum laminating device for pressing the base material and resin under reduced pressure to form a pre-laminate; and
   a first flat press laminating device for pressing the pre-laminate to form a laminate,
   wherein the vacuum laminating device includes a pair of plate blocks facing each other, and at least one of the plate blocks is set so as to be movable upwardly and downwardly relative to the other of the plate blocks, whereby the base material and resin are pressed between the pair of plate blocks,
   wherein the upwardly and downwardly movable plate block includes an elastic pressing plate and a buffer material, and the buffer material has a multi-layer structure comprised of not less than three layers including two fiber layers and a rubber layer,
   wherein the laminating apparatus is configured to form the laminate having a uniform thickness and an absence of voids when a pressing force against the base material and resin between the pair of plate blocks is set in the range of 625000 to 992500 Newtons, and
   wherein both outermost layers of the buffer material are comprised of the fiber layers.

2. The laminating apparatus according to claim 1,
   wherein a hydraulic cylinder is coupled to the movable plate block of the vacuum laminating device, and the movable plate block is movable upwardly and downwardly by the operation of the hydraulic cylinder, and
   wherein the hydraulic cylinder has a cylinder diameter of not less than 200 mm.

3. The laminating apparatus according to claim 1, further comprising
   a second flat press laminating device,
   wherein the second flat press laminating device includes a pair of plate blocks facing each other, and at least one of the plate blocks of the second flat press laminating device is set so as to be movable upwardly and downwardly relative to the other of the plate blocks of the second flat press laminating device, whereby a laminate obtained through the pressing by the first flat press laminating device is further pressed between the pair of plate blocks of the second flat press laminating device.

4. The laminating apparatus according to claim 1,
   wherein the elastic pressing plate in the vacuum laminating device comprises at least one selected from the group consisting of fluoro rubber, silicone rubber, ethylene-vinyl acetate copolymer, acrylic rubber, and epichlorohydrin rubber.

5. A laminating apparatus for laminating resin to a base material to form a laminate, comprising:
   a vacuum laminating device for pressing the base material and resin under reduced pressure to form a pre-laminate; and
   a first flat press laminating device for pressing the pre-laminate to form a laminate,
   wherein the vacuum laminating device includes a pair of plate blocks facing each other, and at least one of the plate blocks is set so as to be movable upwardly and downwardly relative to the other of the plate blocks, whereby the base material and resin are pressed between the pair of plate blocks, wherein the upwardly and downwardly movable plate block includes a flat pressing plate, an elastic pressing plate and a buffer material, and the buffer material has a multi-layer structure comprised of not less than three layers including a two fiber layers and a rubber layer, wherein the first flat press laminating device includes a pair of plate blocks facing each other, and at least one of the plate blocks is set so as to be movable upwardly and downwardly relative to the other of the plate blocks, whereby the pre-laminate is pressed between the pair of plate blocks, wherein the laminating apparatus is configured to form the laminate having a uniform thickness and an absence of voids when a pressing force against the pre-laminate between the pair of plate blocks is set in the range of 625000 to 992500 Newtons, and wherein both outermost layers of the buffer material are comprised of the fiber layers.

6. The laminating apparatus according to claim 5, wherein a hydraulic cylinder is coupled to the movable plate block of the first flat press laminating device, and the movable plate block is movable upwardly and downwardly by the operation of the hydraulic cylinder, and wherein the hydraulic cylinder has a cylinder diameter of not less than 200 mm.

7. The laminating apparatus according to claim 5, further comprising a second flat press laminating device, wherein the second flat press laminating device includes a pair of plate blocks facing each other, and at least one of the plate blocks of the second flat press laminating device is set so as to be movable upwardly and downwardly relative to the other of the plate blocks of the second flat press laminating device, whereby a laminate obtained through the pressing by the first flat press laminating device is further pressed between the pair of plate blocks.

8. The laminating apparatus according to claim 5, wherein the elastic pressing plate in the vacuum laminating device comprises at least one selected from the group consisting of fluoro rubber, silicone rubber, ethylene-vinyl acetate copolymer, acrylic rubber, and epichlorohydrin rubber.

\* \* \* \* \*